(12) United States Patent
Shinano

(10) Patent No.: US 12,461,331 B2
(45) Date of Patent: Nov. 4, 2025

(54) LENS BARREL AND CAMERA EQUIPPED WITH SAME

(71) Applicant: Panasonic Intellectual Property Management Co., Ltd., Osaka (JP)

(72) Inventor: Fumio Shinano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 503 days.

(21) Appl. No.: 17/975,726

(22) Filed: Oct. 28, 2022

(65) Prior Publication Data

US 2023/0384555 A1 Nov. 30, 2023

(30) Foreign Application Priority Data

May 31, 2022 (JP) .................................. 2022-088662

(51) Int. Cl.
*G02B 7/08* (2021.01)
*G02B 7/02* (2021.01)
*G02B 9/60* (2006.01)

(52) U.S. Cl.
CPC ............... *G02B 7/08* (2013.01); *G02B 7/022* (2013.01); *G02B 9/60* (2013.01)

(58) Field of Classification Search
CPC . G02B 7/08; G02B 7/022; G02B 9/60; G02B 7/102; G02B 7/04; G02B 7/10
See application file for complete search history.

(56) References Cited

U.S. PATENT DOCUMENTS

| 2011/0141340 | A1 | 6/2011 | Yumiki et al. |
| 2019/0137729 | A1* | 5/2019 | Yokoyama ............. G02B 7/021 |
| 2020/0026023 | A1* | 1/2020 | Nagaoka ................ H04N 23/55 |
| 2020/0363605 | A1* | 11/2020 | Saito ...................... G03B 13/36 |
| 2023/0067335 | A1* | 3/2023 | Chen ...................... G02B 7/105 |

FOREIGN PATENT DOCUMENTS

| JP | 2001-215389 | A | | 8/2001 |
| JP | 2006003402 | A | * | 1/2006 |
| JP | 2009-282394 | A | | 12/2009 |
| WO | 2008/139723 | A1 | | 11/2008 |

* cited by examiner

*Primary Examiner* — Ephrem Z Mebrahtu
(74) *Attorney, Agent, or Firm* — Renner, Otto, Boisselle & Sklar, LLP

(57) ABSTRACT

A lens barrel (10) comprises a lens mount (23), a fifth lens group unit (17), a cam frame (13), a cam pin (17*c*), a cam pin holder (17*b*), a main shaft (17*g*), and an urging spring (17*f*). The cam frame 13 encloses the fifth lens group unit 17, and has a cam groove 13*a*. The cam pin 17*c* moves in the optical axis direction in a state of being engaged with the cam groove 13*a*. The cam pin holder 17*b* is provided to the fifth lens group unit 17 in a state of being capable of relative motion in the optical axis direction, and holds the cam pin 17*c*. The main shaft 17*g* allows the fifth lens group unit 17 to move in the optical axis direction. The urging spring 17*f* is provided to the fifth lens group unit 17, urges the cam pin holder 17*b* toward the subject side in the optical axis direction, and contracts when the teleconverter 30 is mounted to the lens mount 23 to retract the fifth lens group unit 17 in the optical axis direction.

15 Claims, 26 Drawing Sheets

LENS BARREL AND CAMERA EQUIPPED WITH SAME

CROSS-REFERENCE TO RELATED APPLICATIONS

This application claims priority to Japanese Patent Application No. 2022-088662 filed on May 31, 2022. The entire disclosure of Japanese Patent Application No. 2022-088662 is hereby incorporated herein by reference.

BACKGROUND

Technical Field

The present invention relates to a lens barrel and a camera equipped with the same.

Description of the Related Art

Recent years have seen the use of a lens barrel that comprises an optical system including a plurality of lenses, and that is replaceably mounted to a camera body. With a lens barrel such as this, a teleconverter is sometimes mounted between the lens barrel and the camera body to extend the focal length.

A teleconverter can extend the focal length of a lens barrel by being mounted to the mounting portion of the camera body and the mounting portion of the lens barrel.

When this is done, there is the risk that a teleconverter-side member may interfere with the member of the lens barrel that is provided closest to the camera body in the optical axis direction, resulting in damage to the part.

For example, Patent Literature 1 discloses zoom lens barrel in which, in order to prevent deterioration of the optical performance of the imaging optical system due to an external force applied to the lens barrel, the cam ring is made up of a lens support ring portion in which is formed an inner surface cam groove, and a distal end outer peripheral ring portion that consists of a separate member from the lens support ring portion and is supported on the distal end outer periphery of the lens support ring portion so as to rotate together in the rotational direction, the distal end outer peripheral ring portion is supported at a clearance in the optical axis direction with respect to the lens barrel, and a urging spring, which urges the distal end outer peripheral ring portion to move in the optical axis direction and bends when an external force from the outside of the lens barrel acts on the distal end outer peripheral ring portion, is inserted into the clearance portion between the distal end outer peripheral ring portion and the lens support ring portion in the optical axis direction.

CITATION LIST

Patent Literature

Patent Literature 1: JP-A 2001-215389

SUMMARY

Problem to be Solved by the Invention

However, the following problems are encountered with the conventional zoom lens barrel discussed above.

That is, with the zoom lens barrel disclosed in the above-mentioned document, a configuration is employed in which, when an external barrel is subjected to an external force, a compression spring contracts and the second cam barrel is displaced, thereby preventing the internal lens frames from breaking, while retraction is limited to the optical axis direction by means of a rotation stop.

However, with this configuration, when a teleconverter is mounted between the camera body and the lens barrel, there is the risk that a teleconverter-side member may interfere with a lens frame on the lens barrel side in the optical axis direction, resulting in damage to the parts, etc.

It is an object of the present invention to provide a lens barrel, and a camera equipped with this lens barrel, with which problems such as damage to parts when a teleconverter is mounted can be avoided.

Means for Solving Problem

The lens barrel disclosed herein is a lens barrel that is attached to a camera body in a replaceable state, the lens barrel comprising a mounting unit, a retractable lens frame, a substantially cylindrical cam frame, a cam pin, a cam pin holder, a first guide shaft, and an urging spring. A teleconverter is mounted to mounting unit. The retractable lens frame includes an optical lens that interferes in the optical axis direction when the teleconverter is mounted. The substantially cylindrical cam frame encloses the retractable lens frame and has a cam groove. The cam pin protrudes in a direction intersecting the optical axis direction and moves in the optical axis direction in a state of being engaged with the cam groove formed in the cam frame. The cam pin holder is provided to the retractable lens frame in a state of being capable of relative motion in the optical axis direction, and holds the cam pin. The first guide shaft is disposed along the optical axis direction and allows the retractable lens frame to move in the optical axis direction. The urging spring is provided to the retractable lens frame, urges the cam pin holder toward the subject side in the optical axis direction, and contracts when the teleconverter is mounted to the mounting unit so as to retract the retractable lens frame in the optical axis direction.

Effects

With the lens barrel disclosed herein, even when a teleconverter is mounted, damage to parts and other such problems can be avoided.

DETAILED DESCRIPTION OF THE EMBODIMENTS

Embodiments will now be described in detail with reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

A lens barrel 10 and a camera 100 including the lens barrel 10 according to an embodiment of the present disclosure will now be described with reference to FIGS. 1 to 15.

Overall Configuration of Lens Barrel 10

The lens barrel 10 according to this embodiment is detachably mounted to a camera body 50 together with a teleconverter 30 (discussed below) and is mounted to the mounting portion of the camera body 50 to constitute the camera 100 (see FIG. 15). The lens barrel 10 has an optical system (lenses L1 to L20 (see FIG. 2A, etc.)) that guides the subject image to an imaging element provided on the camera body 50 side.

Figure 1A:
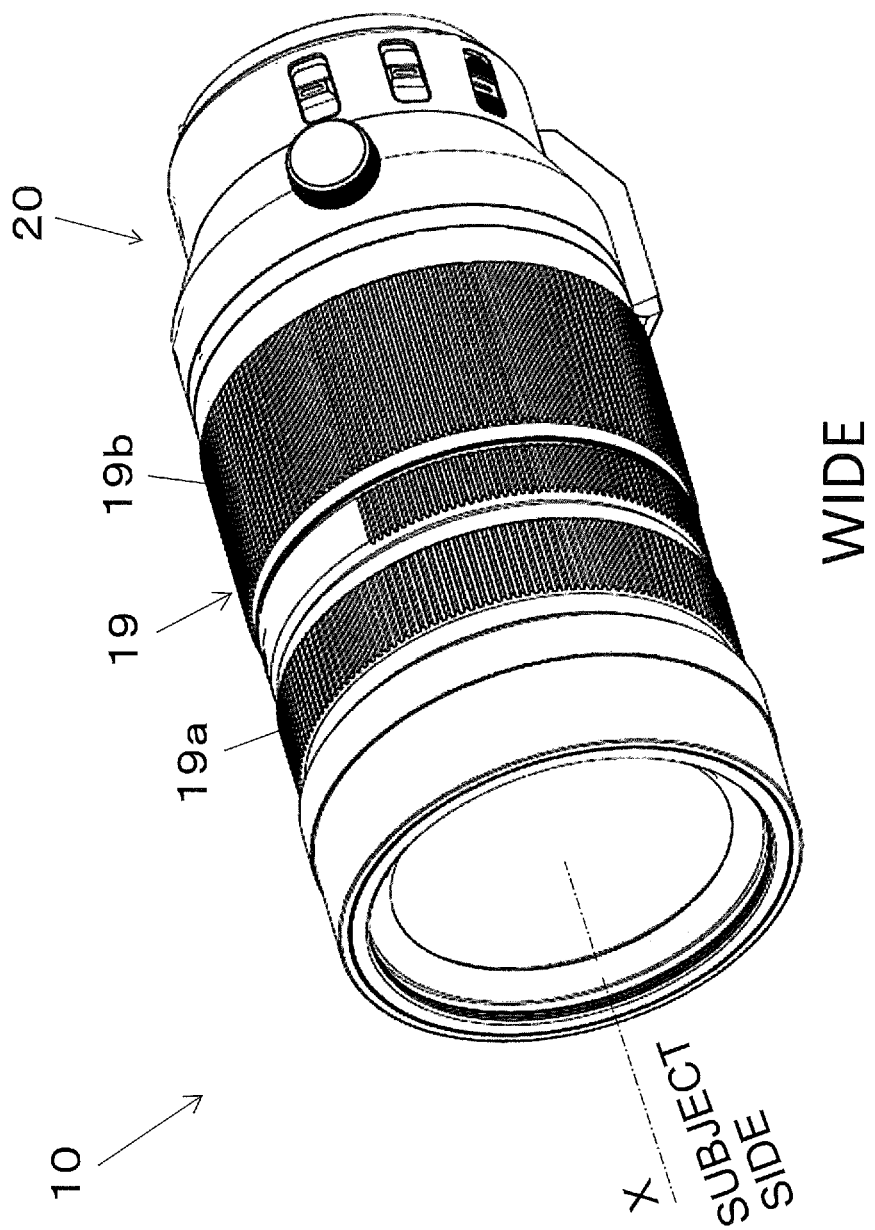
FIG. 1A is an oblique view of a state in which the optical system of a lens barrel including a lens hood holding structure according to an embodiment of the present disclosure is on the wide-angle side (WIDE position)
Figure 1B:
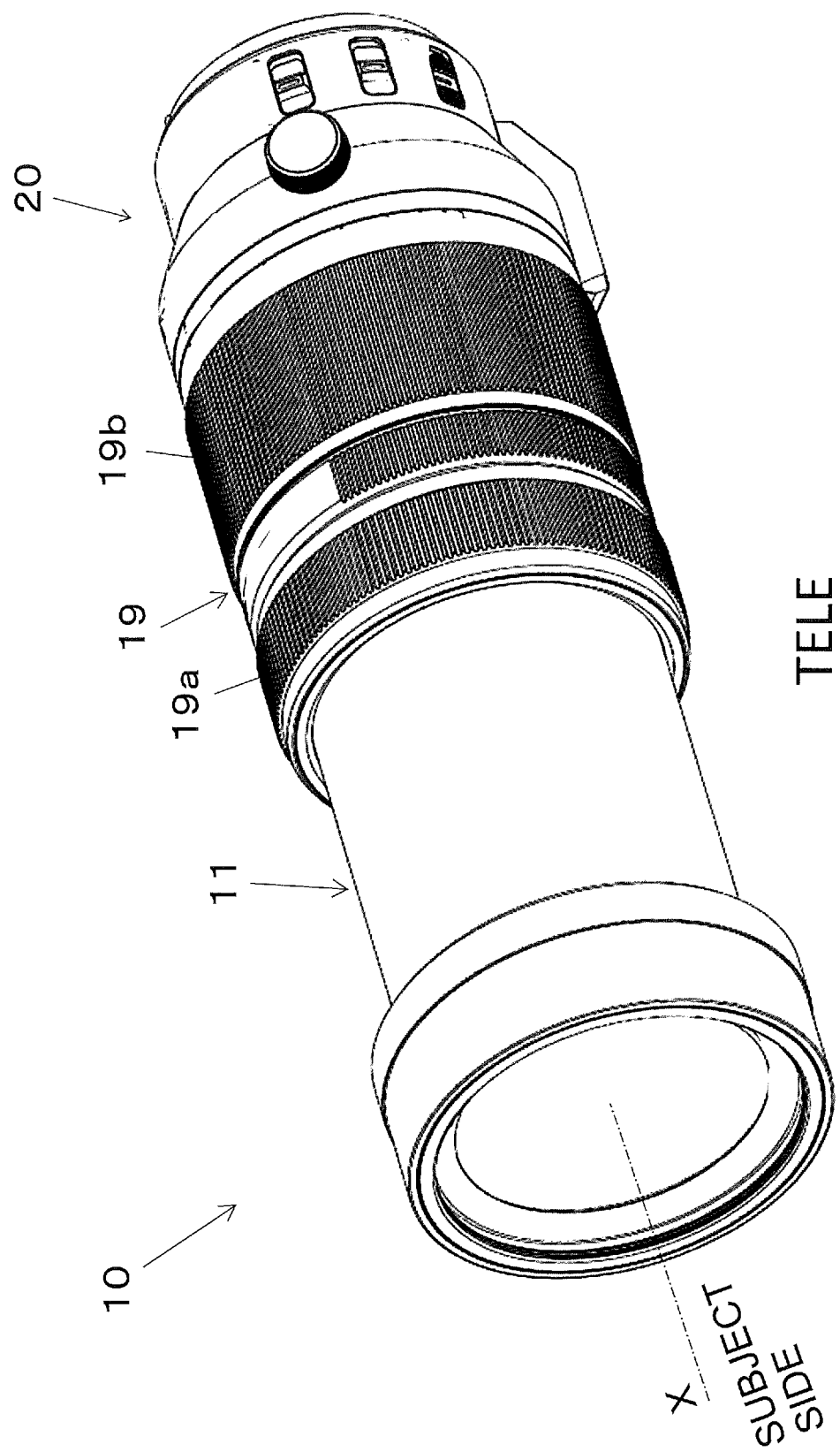
FIG. 1B is an oblique view of a state in which the optical system of the lens barrel in FIG. 1A has moved to the telephoto side (TELE position)

Also, as shown in FIGS. 1A and 1B, the lens barrel 10 can perform variable-power photography by moving the built-in optical system between the wide-angle side (WIDE position) and the telephoto side (TELE position).

Figure 2A:
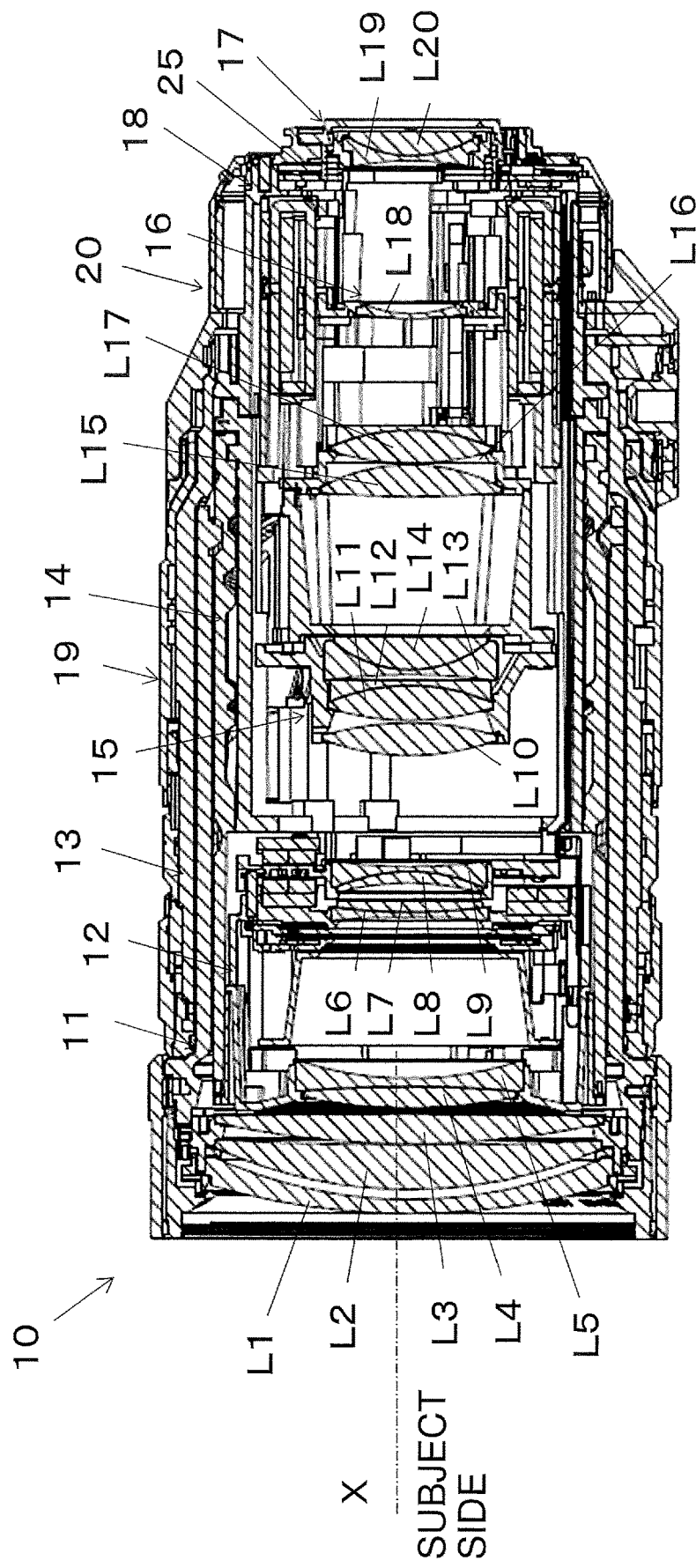
FIG. 2A is a cross-sectional view of the lens barrel in FIG. 1A.

When the lens barrel 10 is in the WIDE position shown in FIG. 1A, a first lens group unit 11 is accommodated on the inner peripheral surface side of an exterior unit 19 as shown in FIG. 2A.

Figure 2B:
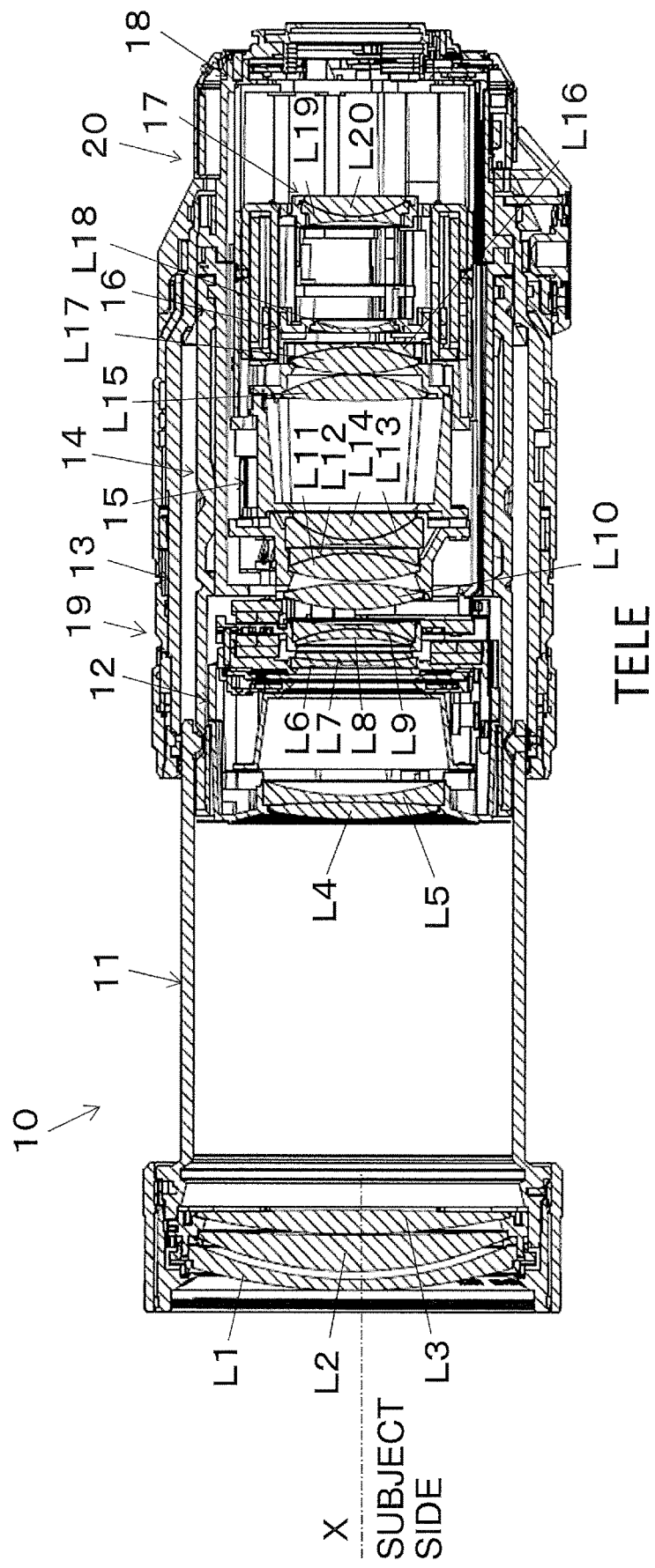
FIG. 2B is a cross-sectional view of the lens barrel in FIG. 1B.

On the other hand, when the lens barrel 10 is in the TELE position shown in FIG. 1B, the first lens group unit 11 advances toward the subject in the optical axis X direction, and protrudes from the exterior unit 19 toward the subject, as shown in FIG. 2B.

Figure 3:
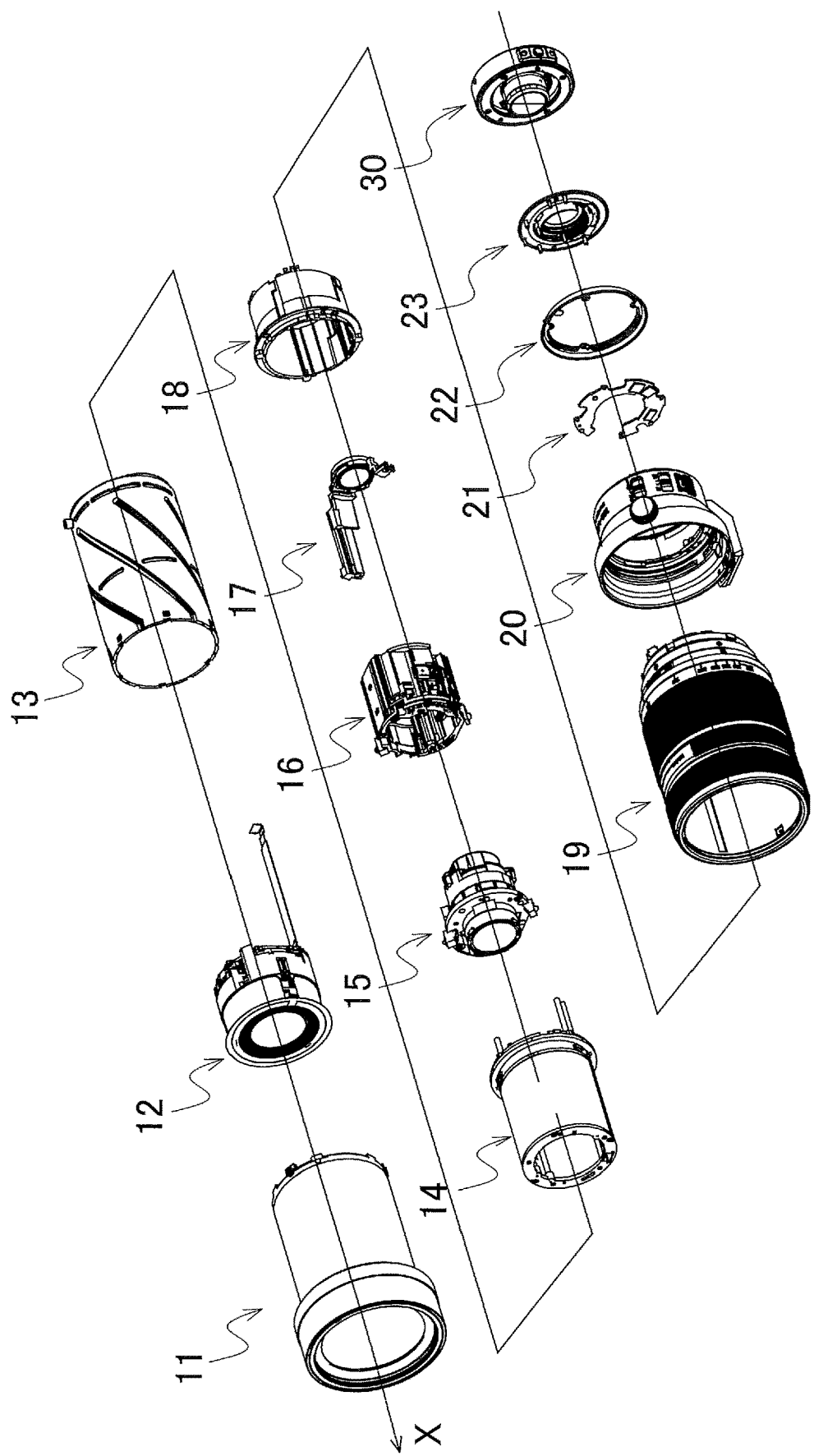
FIG. 3 is an exploded oblique view of the components that constitute the lens barrel in FIG. 1A.

As shown in FIG. 3, the lens barrel 10 comprises an optical system made up of the first lens group unit 11, a second lens group unit 12, a cam frame 13, a fixed frame 14, a third lens group unit 15, a fourth lens group unit 16, a fifth lens group unit (retractable lens frame) 17, a mounting base 18, an exterior unit 19, a rear frame 20, a control board (display control unit) 21, a lens attachment index ring unit 22, a lens mount (mounting unit) 23, and a plurality of lenses L1 to L20. In the lens barrel 10, a teleconverter 30 is mounted between the camera body 50 and the end of the lenses L1 to L20 on the opposite side from the subject side (the lens mount 23 side) in the optical axis X direction.

As shown in FIG. 3, the first lens group unit 11 is a cylindrical member disposed closest to the subject in the lens barrel 10. As shown in FIGS. 2A and 2B, the first lens group unit 11 moves back and forth in the optical axis X direction while holding the lenses L1 to L3 on the subject side. This allows wide-angle photography and telephoto photography to be performed by varying the distances between the lenses L1 to L20.

As shown in FIGS. 2A and 2B, etc., the second lens group unit 12 is a cylindrical member disposed on the inner peripheral surface side of the first lens group unit 11, and holds lenses the L4 to L9.

As shown in FIG. 3, the cam frame 13 is a cylindrical member disposed on the outer peripheral surface side of the fourth lens group unit 16. A cam groove 13a, into which a cam pin (not shown) of the fourth lens group unit 16, a cam pin 17c provided on the outer peripheral surface of the fifth lens group unit 17, and the like are fitted, is formed in the cam frame 13.

Consequently, upon receiving a rotational driving force applied from a rotational driving source (not shown), the cam pin 17c and the like move along the cam groove 13a, which allows movement back and forth from the first lens group unit 11 to the fifth lens group unit 17 in the optical axis X direction. Therefore, wide-angle photography, telephoto photography, and the like can be performed by adjusting the distances between the lenses L1 to L20 included in the first lens group unit 11 to the fifth lens group unit 17.

As shown in FIG. 3, the fixed frame 14 is a cylindrical member disposed on the outer peripheral side of the cylindrical first lens group unit 11 and the fourth lens group unit 16, and is disposed so as to cover the outer peripheral surface from the first lens group unit 11 to the fourth lens group unit 16. Also, the fixed frame 14 has a through-groove 14a that allows communication between the substantially cylindrical inner peripheral surface and outer peripheral surface.

The cam pin 17c, etc., are inserted into the through-groove 14a. The cam pin 17c moves along the cam groove 13a while engaged with the cam groove 13a of the cam frame 13 via the through-groove 14a.

As shown in FIG. 3, the third lens group unit 15 is disposed on the inner peripheral side of the cylindrical fourth lens group unit 16 in a state of being movable in the optical axis X direction. The third lens group unit 15 is driven by an actuator (not shown), and moves back and forth in the optical axis X direction while holding the lenses L10 to L17.

The fourth lens group unit 16 has a substantially cylindrical shape, and is disposed downstream from the third lens group unit 15 when viewed from the subject side in the optical axis X direction, as shown in FIG. 3. The fourth lens group unit 16 holds the lens L18.

As shown in FIG. 3, the fifth lens group unit 17 is disposed on the inner peripheral side of the cylindrical fourth lens group unit 16 so as to be movable in the optical axis X direction. The fifth lens group unit 17 moves back and forth in the optical axis X direction when driven by an actuator (not shown), while holding the lenses L19 and L20.

As shown in FIG. 3, the mounting base 18 is a substantially cylindrical member that serves as the base of the lens barrel 10, and the fourth lens group unit 16 is fixed to its the inner peripheral surface side. Also, the cam frame 13 is attached to the mounting base 18 in a state of being capable of relative rotation.

As shown in FIGS. 1A, 4, etc., the exterior unit 19 is a cylindrical member that constitutes the exterior portion of the lens barrel 10. An annular focus ring 19a, a zoom ring 19b, and the like are attached to the outer peripheral surface in a rotatable state.

The rear frame 20 is attached to the end of the exterior unit 19 on the opposite side from the subject, and constitutes the exterior portion of the lens barrel 10 together with the exterior unit 19. The rear frame 20 is attached so as to rotate relative to the mounting base 18 and the exterior unit 19.

The control board 21 is provided near the end of the lens barrel 10 on the opposite side from the subject side in the optical axis X direction. The control board 21 is connected to a zoom encoder 25 (see FIGS. 12A, 13, etc.) (discussed below), and controls an actuator (not shown) that changes the relative position of the lenses L1 to L20 on the basis of the zoom position (magnification position) of the lens group sensed by the zoom encoder 25.

The lens attachment index ring unit 22 is a substantially annular member provided at the end of the lens barrel 10 on the opposite side from the subject side in the optical axis X direction, and is given a mark that indicates a reference position in the direction of rotation around the optical axis X when the lens barrel 10 is mounted to the camera body 50 or the teleconverter 30.

The lens mount (mounting unit) 23 is fixed to the mounting base 18, and when the lens barrel 10 is mounted on the camera body 50 or the teleconverter 30, the lens mount 23 is latched to a mounting unit provided to the camera body 50 or the main body portion 31 of or the teleconverter 30.

Figure 4A:
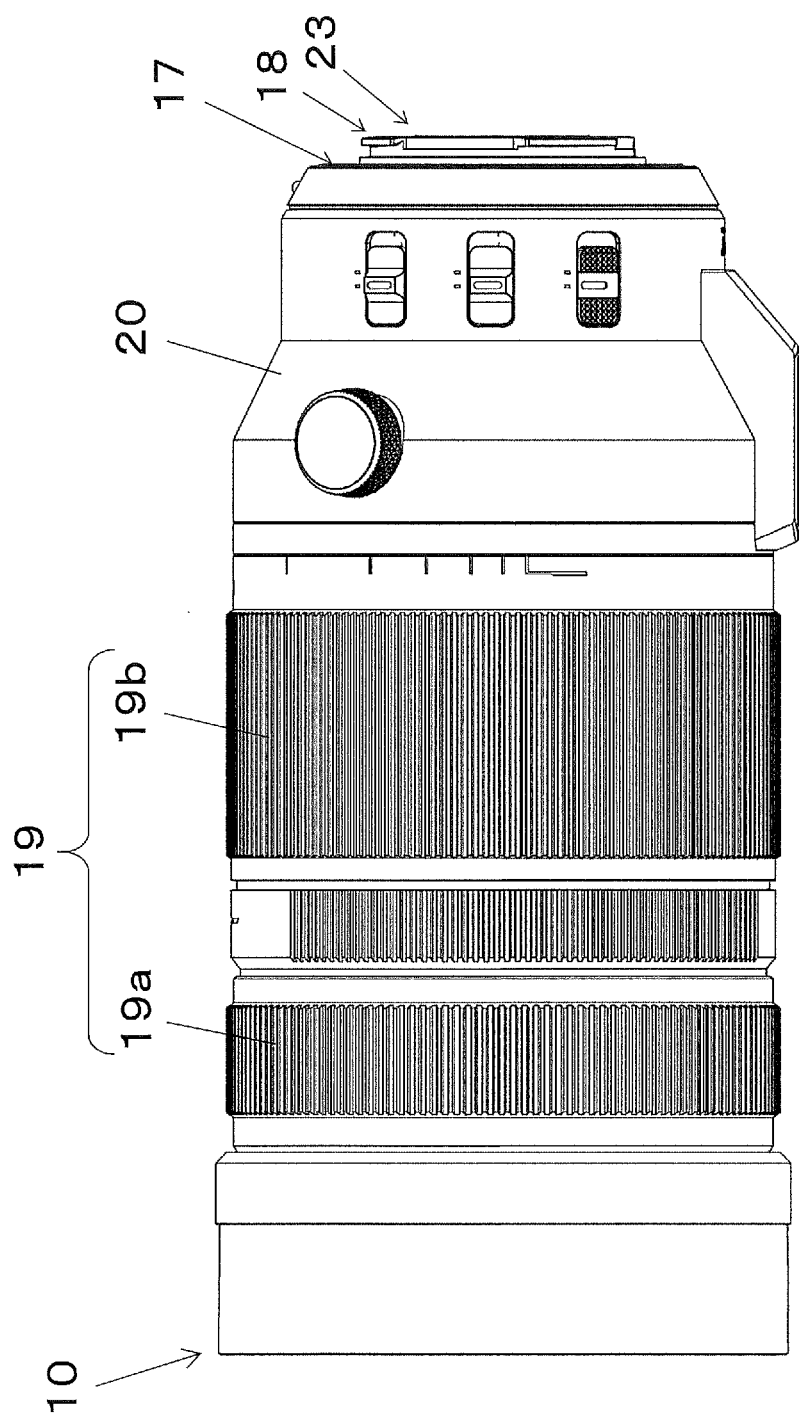
FIG. 4A is a side view of the state before the teleconverter is mounted to the lens barrel in FIG. 1, etc.
Figure 4B:
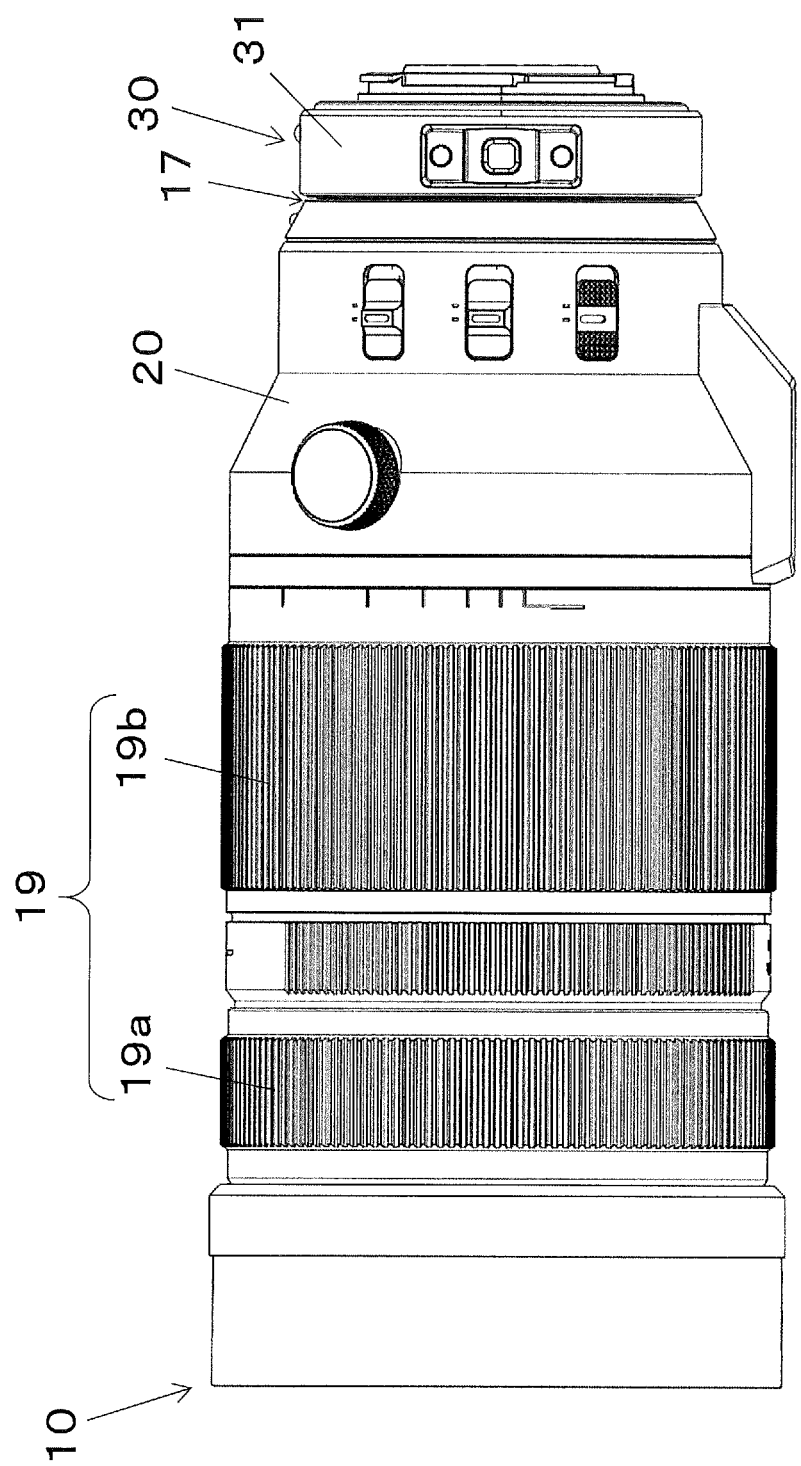
FIG. 4B is a side view of a state in which a teleconverter has been mounted to the end of the lens barrel shown in FIG. 4A on the opposite side from the subject.

The teleconverter 30 is a substantially cylindrical auxiliary member that extends the focal length of the lens barrel 10 in order to allow 1.4-power telephoto shooting, for example. As shown in FIGS. 4A and 4B, the teleconverter 30 is mounted to the end (lens mount 23) of the lens barrel 10 on the side that is connected the camera body 50, and includes a plurality of lenses L21 to L26 inside (see FIG. 5B, etc.).

Figure 5A:
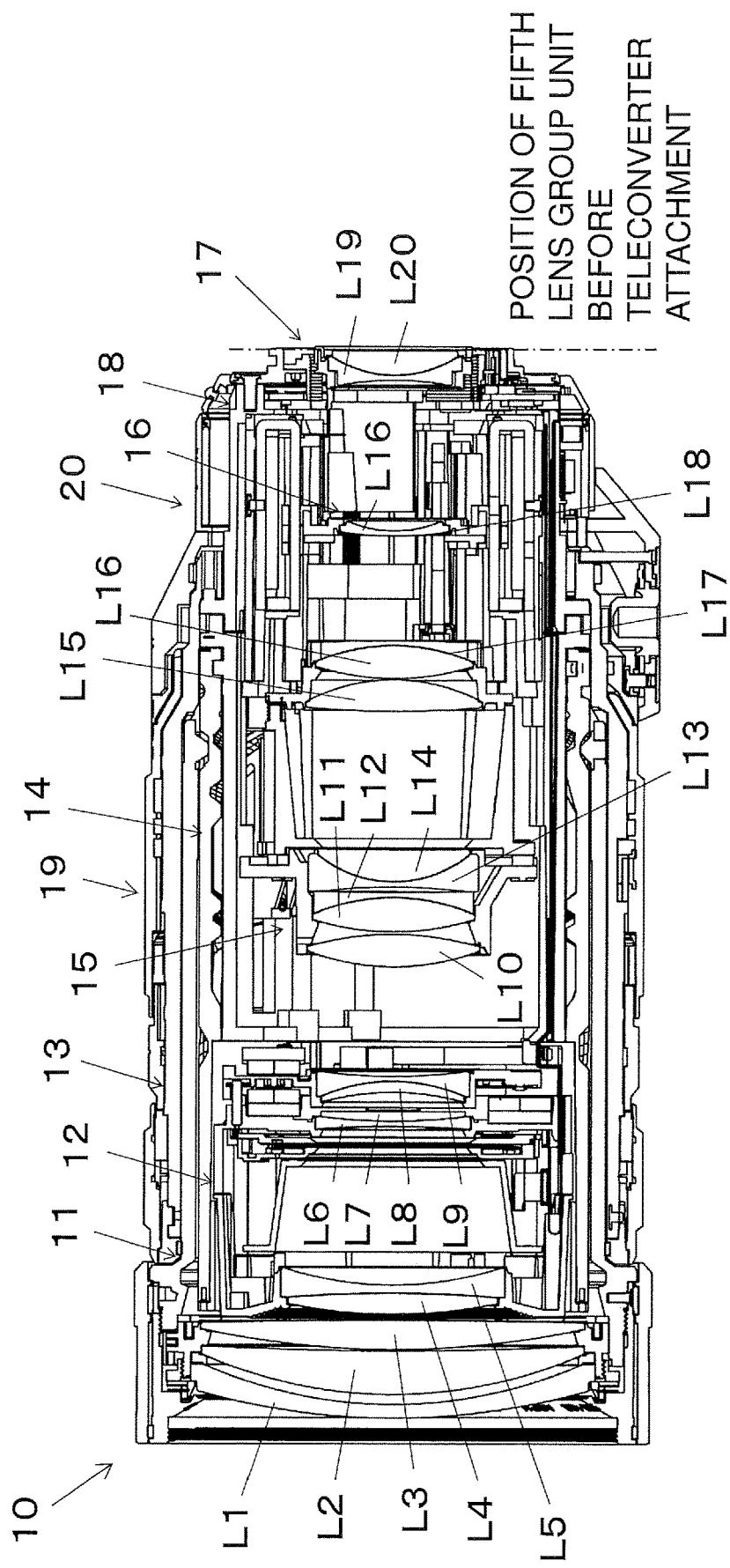
FIG. 5A is a side cross-sectional view of FIG. 4A.

Here, when the teleconverter 30 is mounted to the end of the lens barrel 10 on the opposite side from the subject as shown in FIG. 5A, the lens group (lenses L19 and L20) included in the teleconverter 30 and the lens group (L21 to L26) included in the teleconverter 30 interfere with each other.

That is, the lenses L19 and L20 included in the fifth lens group unit 17 on the lens barrel 10 side are disposed at the end of the lens barrel 10 on the opposite side from the subject in the optical axis X direction at the WIDE position. On the other hand, the lens group included in the teleconverter 30 is disposed so as to protrude toward the side connected to the lens barrel 10.

Figure 5B:
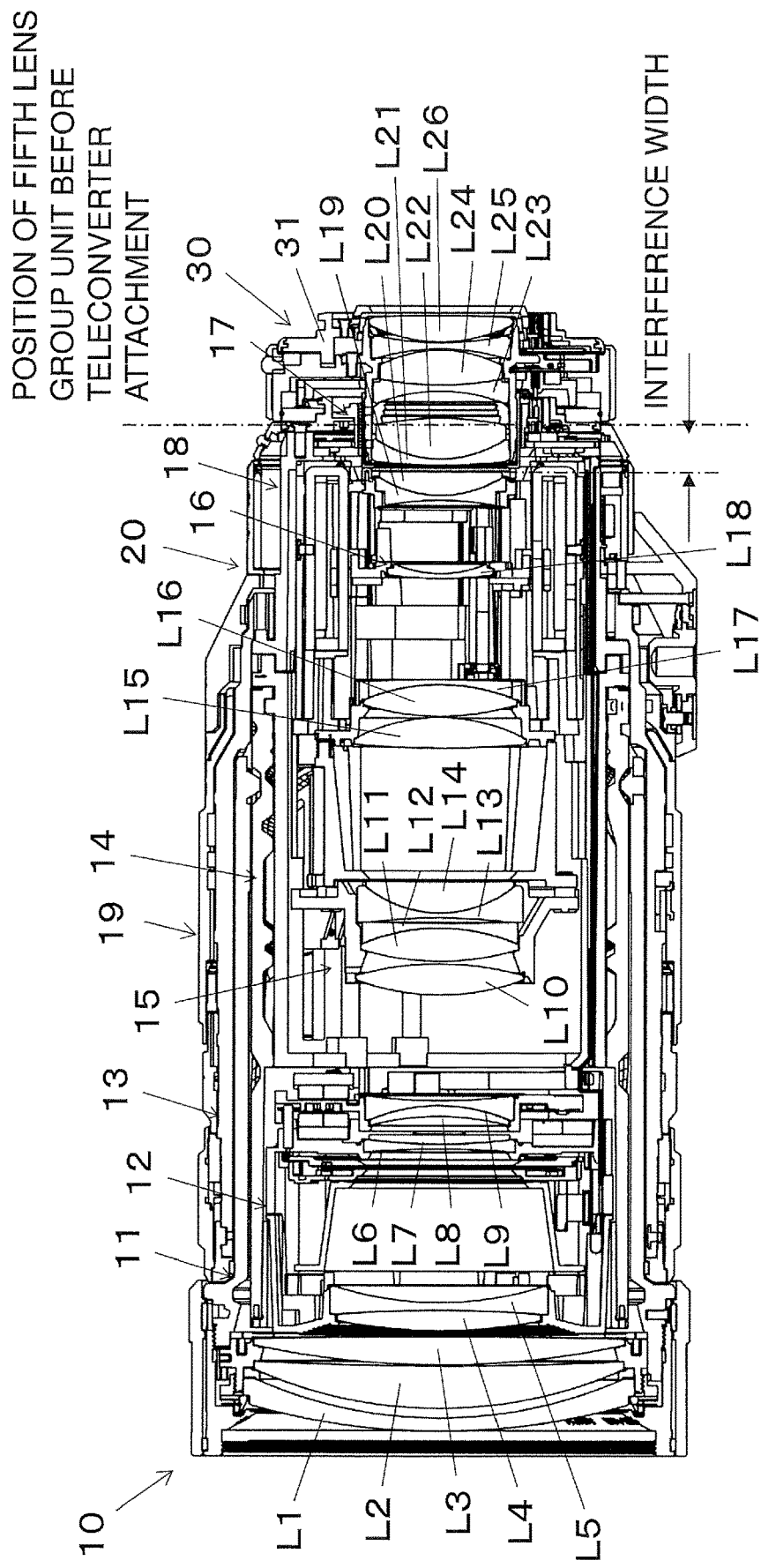
FIG. 5B is a side cross-sectional view of FIG. 4B.

Therefore, when the teleconverter 30 is mounted in a state in which the lens barrel 10 is at the WIDE position shown in FIG. 5B, the lens group (lenses L19 and L20) included in the fifth lens group unit 17 and the lens group (L21 to L26) included in the teleconverter 30 interfere with each other by the interference width shown in FIG. 5B.

Figure 6:
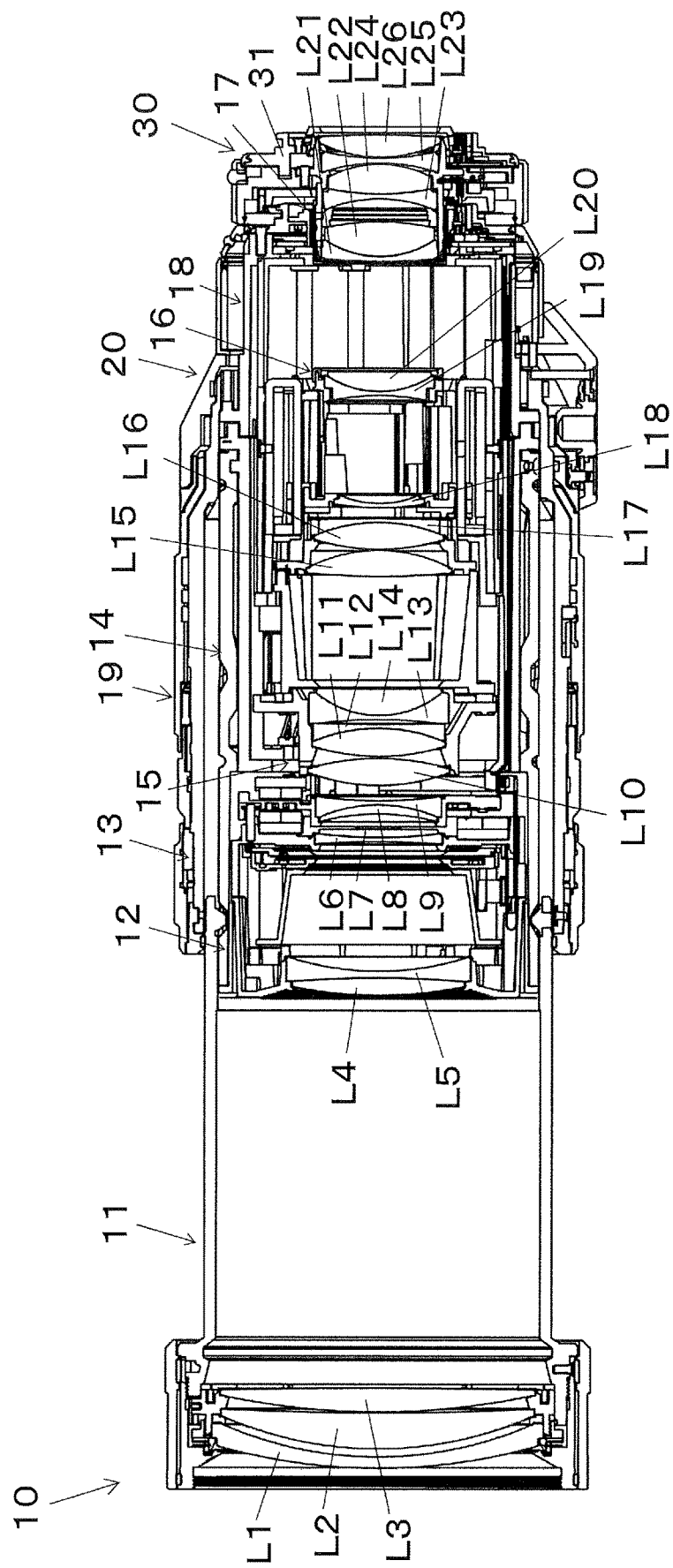
FIG. 6 is a side view showing an interference avoidance state when the lens barrel is at the TELE position with the teleconverter shown in FIG. 5B mounted.

Here, in a state in which the teleconverter 30 is mounted to the end of the lens barrel 10 on the opposite side from the subject in the optical axis X direction as shown in FIG. 5A, when the position is changed to TELE as shown in FIG. 6, the lens group (lenses L19 and L20) included in the fifth lens group unit 17 and the lens group (L21 to L26) included in the teleconverter 30 do not interfere with each other.

Consequently, the lens barrel 10 of this embodiment comprises a retraction mechanism (cam pin holder 17b, urging spring 17f, etc.) on the fifth lens group unit 17 side, for avoiding interference between the lenses L19 and L20 and the lens L21, etc., on the teleconverter 30 side at the WIDE position.

Figure 7A:
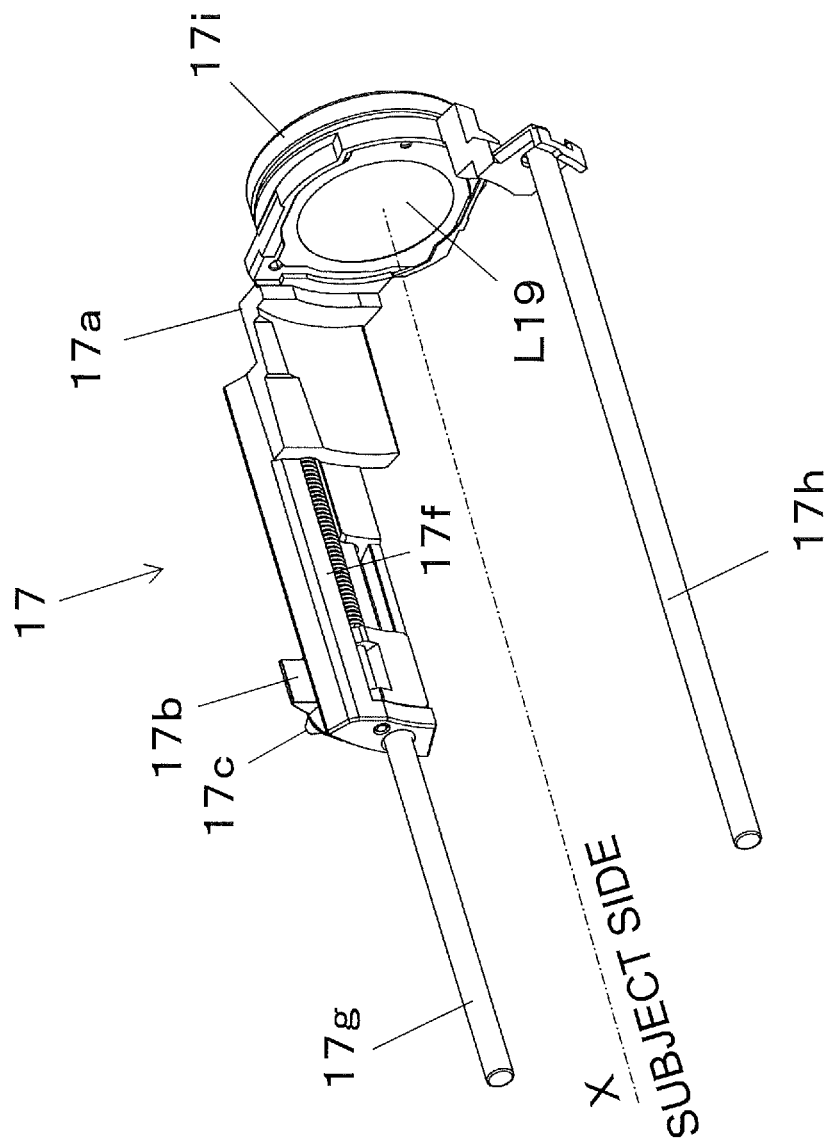
FIG. 7A is an oblique view of the state before the teleconverter is mounted to a fifth lens group unit included in the lens barrel in FIG. 1, etc.
Figure 7B:
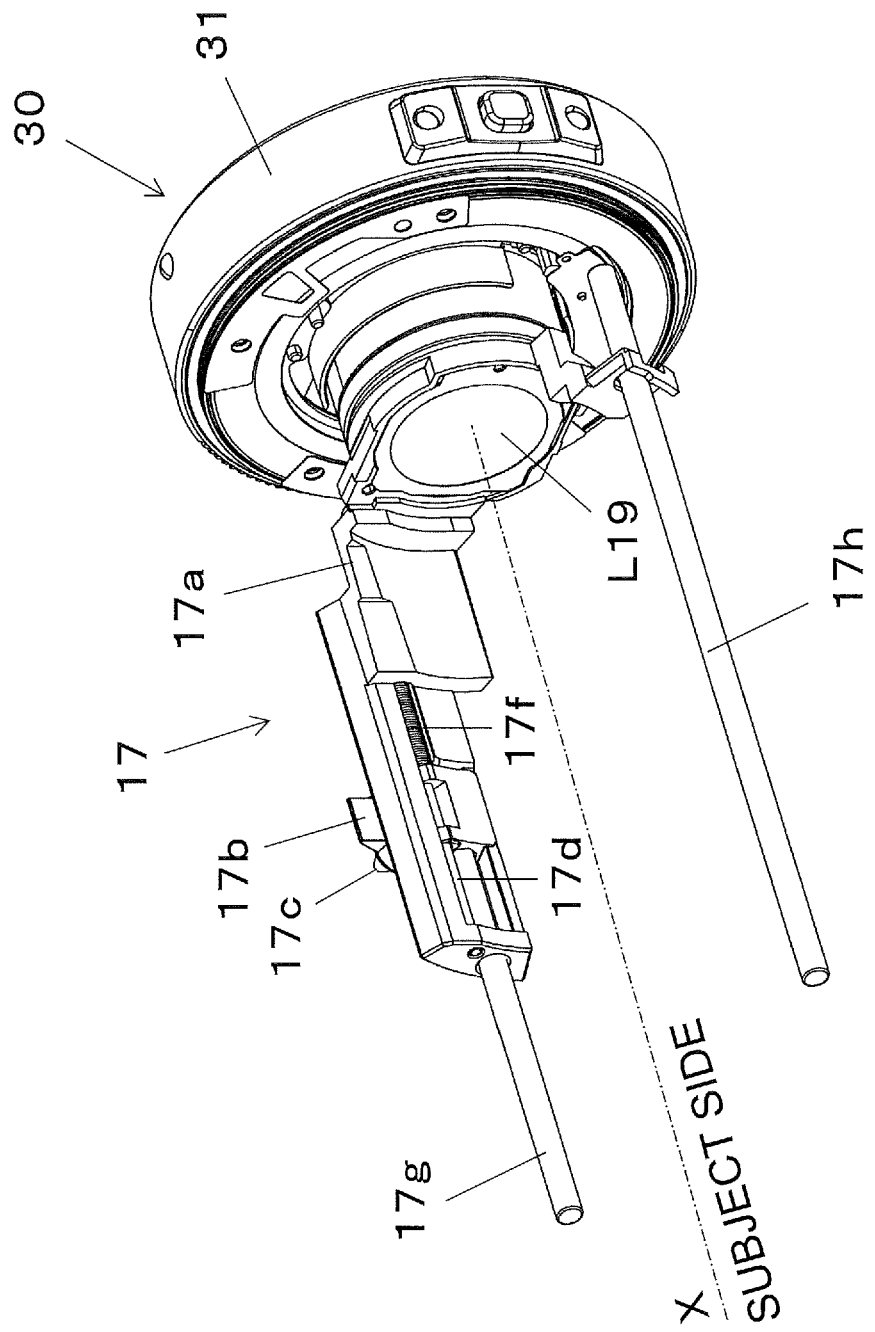
FIG. 7B is an oblique view of a state in which a teleconverter is mounted to the fifth lens group unit included in the lens barrel of FIG. 1, etc.

More specifically, as shown in FIGS. 7A and 7B, the fifth lens group unit 17 comprises a main body portion 17a that holds the lenses L19 and L20, the cam pin holder 17b, the cam pin 17c, a cam pin holder guide shaft (second guide shaft) 17d, a rotation restricting portion 17e, the urging spring 17f, a main shaft (first guide shaft) 17g, a secondary shaft (first guide shaft) 17h, and a cushioning material (buffer member) 17i.

Figure 8A:
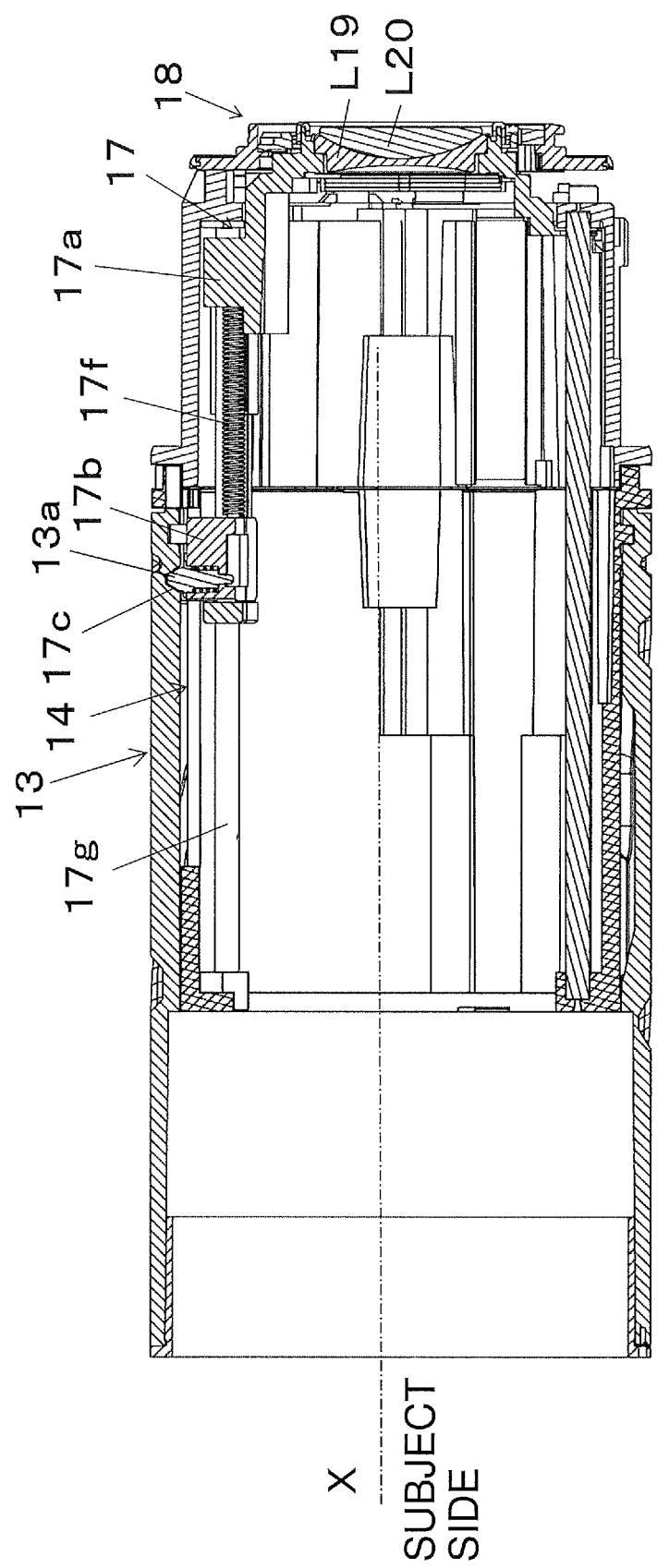
FIG. 8A is a side view of the state before the teleconverter is mounted to the fifth lens group unit included in the lens barrel of FIG. 1, etc.
Figure 8B:
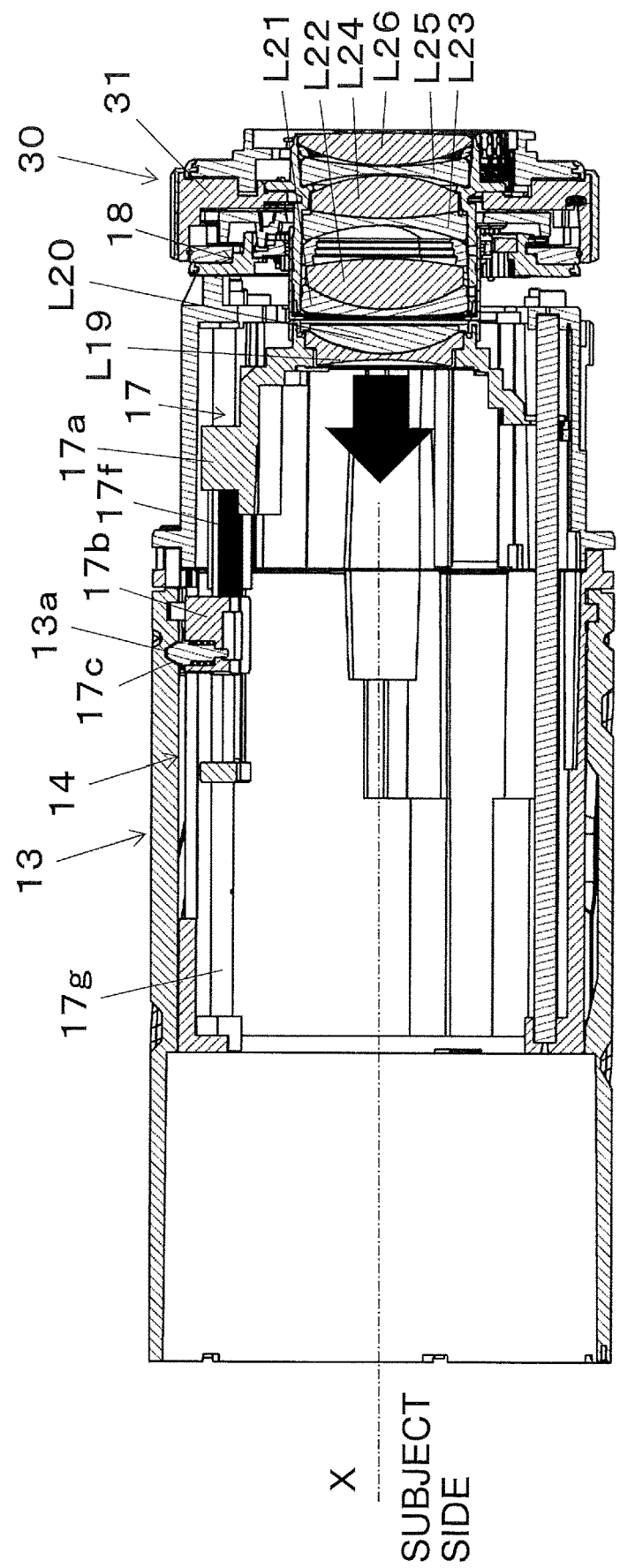
FIG. 8B is a side cross-sectional view showing a state in which a teleconverter is mounted to the fifth lens group unit included in the lens barrel of FIG. 1, etc., and lens interference is avoided.

When the teleconverter 30 is mounted to the end of the lens barrel 10 shown in FIG. on the opposite side from the subject (image plane side) in the optical axis X direction, the fifth lens group unit 17 retracts in the direction of the black arrow in FIG. 8B to avoid interference with the teleconverter 30 side.

At this point, the cam pin holder 17b that holds the cam pin 17c included in the fifth lens group unit 17 does not move, and the cam pin 17c remains engaged with the cam groove 13a of the cam frame 13.

Consequently, as shown in FIGS. 8A and 8B, even when the teleconverter 30 is mounted, only the main body portion 17a included in the fifth lens group unit 17 moves toward the subject in the optical axis X direction.

Therefore, when the teleconverter 30 is mounted, the position of the cam pin holder 17b that holds the cam pin 17c remains unchanged while the main body portion 17a that holds the lenses L19 and L20 is retracted, and this eliminates the effect on the other lens frames that would ensue from the rotation of the cam frame 13, etc.

Figure 9:
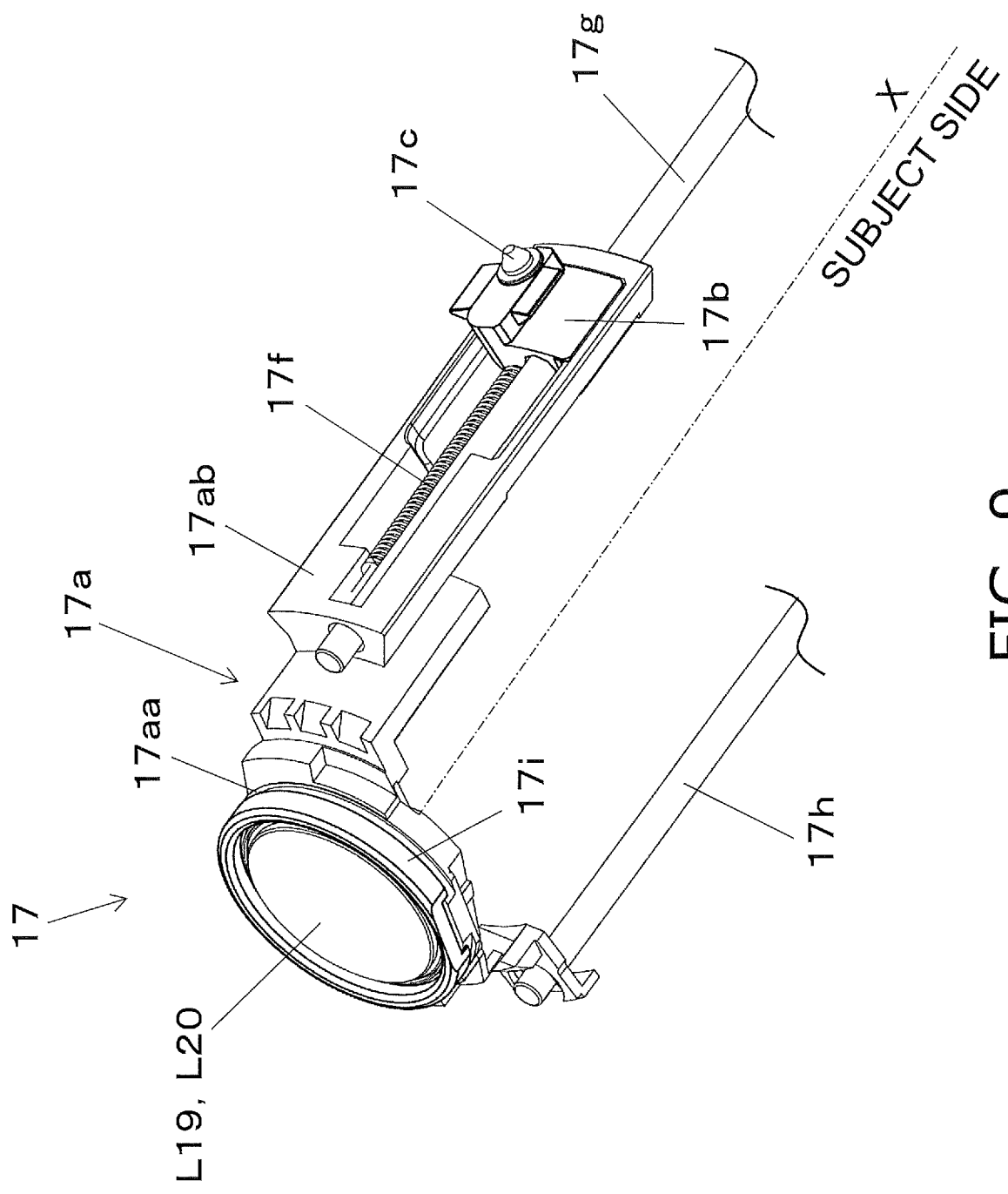
FIG. 9 is an oblique view showing the configuration of the fifth lens group unit in FIG. 7A.

As shown in FIG. 9, the main body portion 17a has a substantially annular lens holding portion (holding portion) 17aa that holds the lenses L19 and L20, and an extension portion 17ab that holds the main shaft 17g and is formed so as to extend from the substantially annular portion along the optical axis X direction.

As shown in FIG. 9, the cam pin holder 17b is provided in a groove formed in the extension portion 17ab of the main body portion 17a. The cam pin holder 17b moves in the extension portion 17ab along the optical axis X direction, thereby moving relative to the lens holding portion 17aa of the main body portion 17a.

Figure 10:
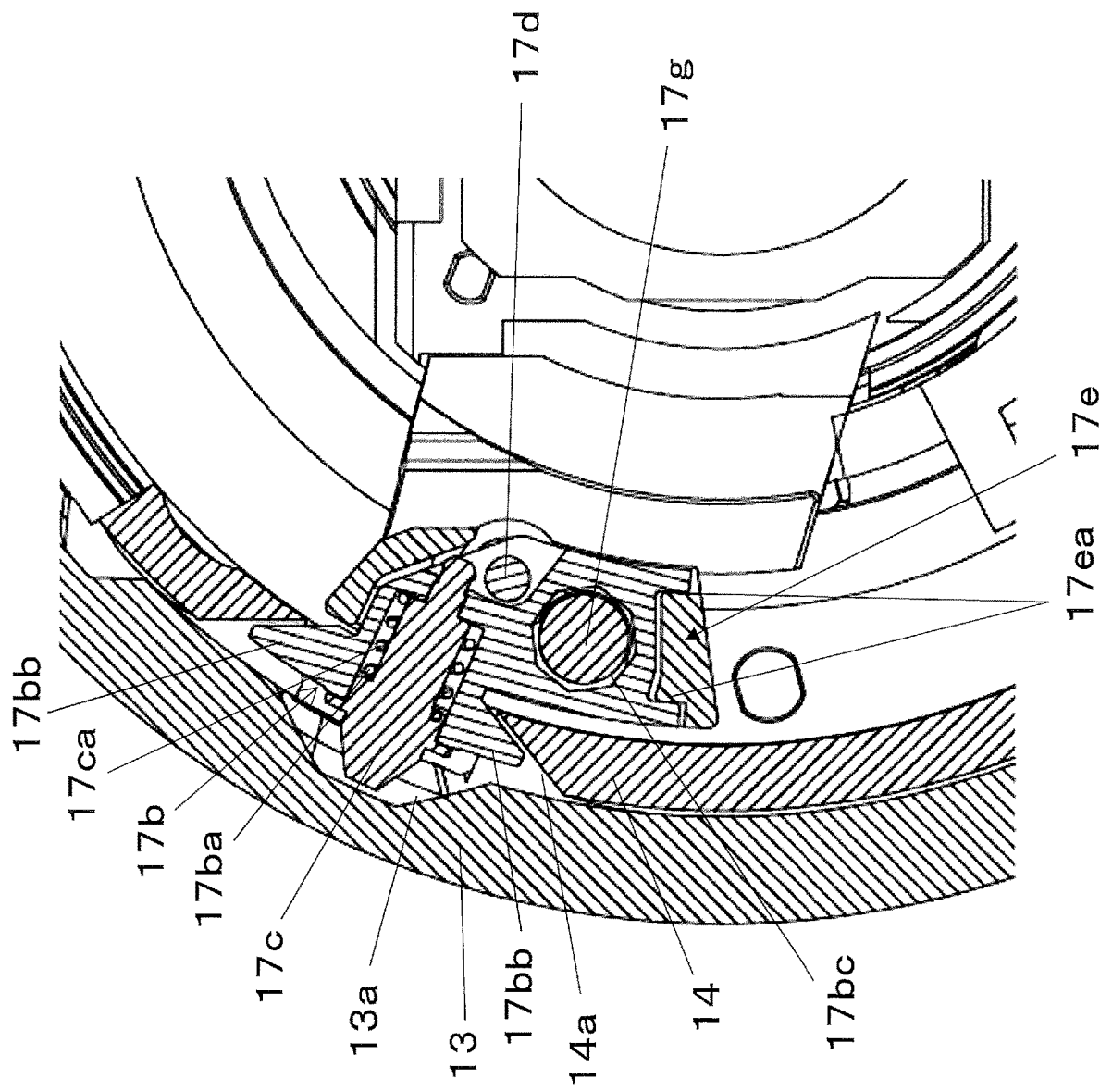
FIG. 10 is a cross-sectional view of the positional relationship between a fixed cylinder and a cam pin and cam cylinder included in the fifth lens group unit in FIG. 9.

Also, as shown in FIG. 10, the cam pin holder 17b has a recess 17ba, a protrusion 17bb, and an insertion hole 17bc.

As shown in FIG. 10, the recess 17ba opens radially outward, and holds the cam pin 17c in its inserted state.

As shown in FIGS. 9 and 10, the protrusion 17bb is formed so as to protrude in a direction intersecting the optical axis X direction. The protrusion 17bb is disposed so as to hook on the inclined surface of the fixed frame 14 in which the through-groove 14a is formed.

Consequently, even if the cam pin 17c tries to leave the cam groove 13a of the cam frame 13 due to an external impact, for example, the protrusion 17bb of the cam pin holder 17b that holds the cam pin 17c will restrict the inward movement of the cam pin holder 17b in the radial direction, which effectively prevents the cam pin 17c from coming out of the cam groove 13a.

As shown in FIG. 10, the insertion hole 17bc is formed so as to pass through the extension portion 17ab of the cam pin holder 17b along the optical axis X direction, and the main shaft 17g is inserted therein.

Here, the main shaft 17g inserted into the insertion hole 17bc is disposed so as to form a specific gap between the inner peripheral surface of the insertion hole 17bc and the outer peripheral surface of the main shaft 17g, as shown in FIG. 10.

As a result, the fifth lens group unit 17 can move smoothly in the optical axis X direction, without its movement being hindered by friction or the like generated between the main shaft 17g and the cam pin holder 17b.

As shown in FIG. 10, the cam pin 17c is disposed so as to project outward in the radial direction in a state of being held in the recess 17ba of the cam pin holder 17b, and its distal end engages with the cam groove 13a of the cam frame 13. Consequently, when the cam frame 13 rotates relatively, the cam pin 17c engaged with the cam groove 13a is moved in the optical axis direction, which allows the relative positions of the lenses L1 to L20 included in the lens barrel 10 to be changed.

As shown in FIG. 10, the cam pin spring 17ca is disposed in the recess 17ba provided to the cam pin holder 17b, so as to be fitted to the outer peripheral surface of the base portion of the cam pin 17c, and urges the cam pin 17c outward in the radial direction.

As shown in FIGS. 7B and 10, the cam pin holder guide shaft (second guide shaft) 17d is disposed in the extension portion 17ab of the main body portion 17a and running along the optical axis X direction. The cam pin holder guide shaft 17d supports the cam pin holder 17b in a state of being able to move back and forth in the optical axis X direction. The urging spring 17f, which urges the cam pin holder 17b in the optical axis X direction, is disposed on the outer peripheral surface side of the cam pin holder guide shaft 17d.

Consequently, the cam pin holder 17b that moves along the cam pin holder guide shaft 17d is held in the extension portion 17ab of the main body portion 17a in a state of being urged in the optical axis X direction by the urging spring 17f.

As shown in FIG. 10, the rotation restricting portion 17e has a contact portion 17ea that comes into contact with the cam pin holder 17b at both ends in the radial direction. The rotation restricting portion 17e restricts rotation of the cam pin holder 17b around the cam pin holder guide shaft 17d by hitting the cam pin holder 17b at a contact portion 17ea.

Figure 11:
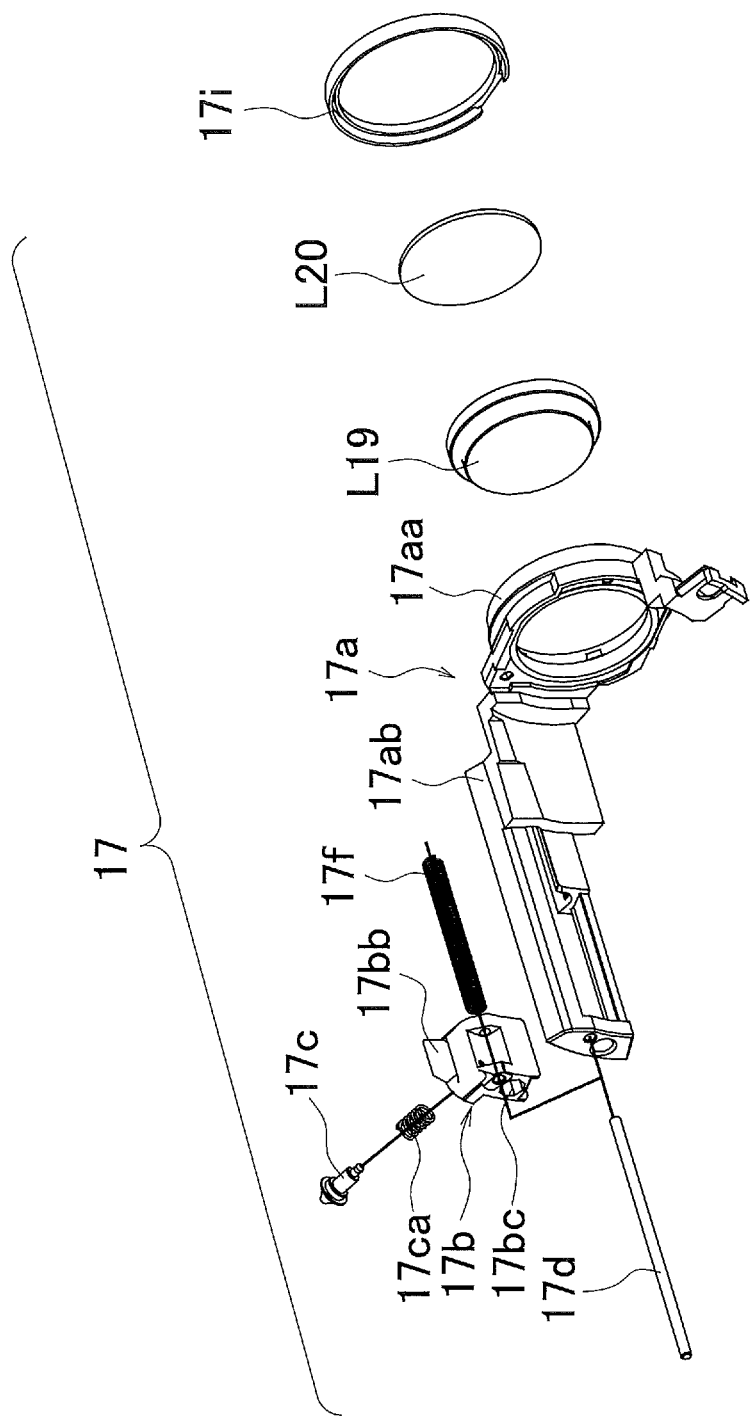
FIG. 11 is an exploded oblique view showing the configuration of the fifth lens group unit in FIG. 9.

As shown in FIG. 11, the urging spring 17f urges the side surface of the cam pin holder 17b, which moves in the optical axis X direction, along the cam pin holder guide shaft 17d in the optical axis X direction in a state of being wound around the outside of the cam pin holder guide shaft 17d. The urging spring 17f contracts when the teleconverter 30 is mounted to the lens mount 23, and moves the main body portion 17a included in the fifth lens group unit 17 in the optical axis X direction without changing the position of the cam pin holder 17b, thereby retracting the main body portion 17a so as not to interfere with the lens L21, etc., on the teleconverter 30 side.

The urging force of the urging spring 17f is such that in a state in which the teleconverter 30 is not mounted, there will be no change in the distance between the lens holding portion 17aa and the cam pin holder 17b held by the extension portion 17ab when the cam pin 17c moves along the cam groove 13a due to the rotation of the cam frame 13.

Consequently, when the cam pin 17c, etc., is driven along the cam groove 13a to change the relative positions of the lenses L1 to L20 to the WIDE position or the TELE position, the effect of the contraction of the urging spring 17f can be eliminated.

On the other hand, because the urging spring 17f contracts only when the teleconverter 30 is mounted to the lens barrel 10, interference with the fifth lens group unit 17 when the teleconverter 30 is mounted can be avoided.

As shown in FIG. 9, the main shaft (first guide shaft) 17g is disposed along the optical axis X direction and guides the fifth lens group unit 17 in the optical axis X direction. As shown in FIG. 10, the main shaft 17g is supported in a state of being inserted into the insertion hole 17bc provided in the cam pin holder 17b, and in a state that allows the cam pin holder 17b to move back and forth in the optical axis X direction.

As shown in FIG. 9, the secondary shaft (first guide shaft) 17h is disposed substantially parallel to the main shaft 17g, and supports the outer peripheral portion of the lens holding portion 17aa of the main body portion 17a of the fifth lens group unit 17.

Consequently, the fifth lens group unit 17 moves back and forth in the optical axis X direction in a state of being supported by the main shaft 17g and the secondary shaft 17h.

The cushioning material (buffer member) 17i is an elastic member that is attached to the end of the fifth lens group unit 17 on the opposite side from the subject in the optical axis direction. As shown in FIG. 11, the cushioning material 17i holds the lenses L19 and L20 so as to sandwich them between itself and the lens holding portion 17aa of the main body portion 17a of the fifth lens group unit 17.

Consequently, even the lens L21, etc., on the teleconverter 30 side should come into contact with the members of the fifth lens group unit 17 when the teleconverter 30 is mounted to the lens mount 23 of the lens barrel 10, the cushioning effect of the cushioning material 17i reduce the impact that results from this contact.

Here, as described above, the lens barrel 10 of this embodiment comprises a retraction mechanism (cam pin holder 17b, urging spring 17f, etc.) for avoiding interference on the fifth lens group unit 17 side between the lenses L19 and L20 and the lens L21, etc., on the teleconverter 30 side at the WIDE position.

Furthermore, with the lens barrel 10 of this embodiment, when the teleconverter 30 is mounted, the lenses L19 and L20 of the fifth lens group unit 17 are in their retracted positions rather than their normal positions, so a control board (display control unit) 21 (see FIG. 15) is provided perform display control so as to advise the user to be careful during photography.

The control board 21 is connected to the zoom encoder 25, and detects whether the positions of the lenses L1 to L20 are in the WIDE position or the TELE position based on the output from the zoom encoder 25.

Figure 12A:
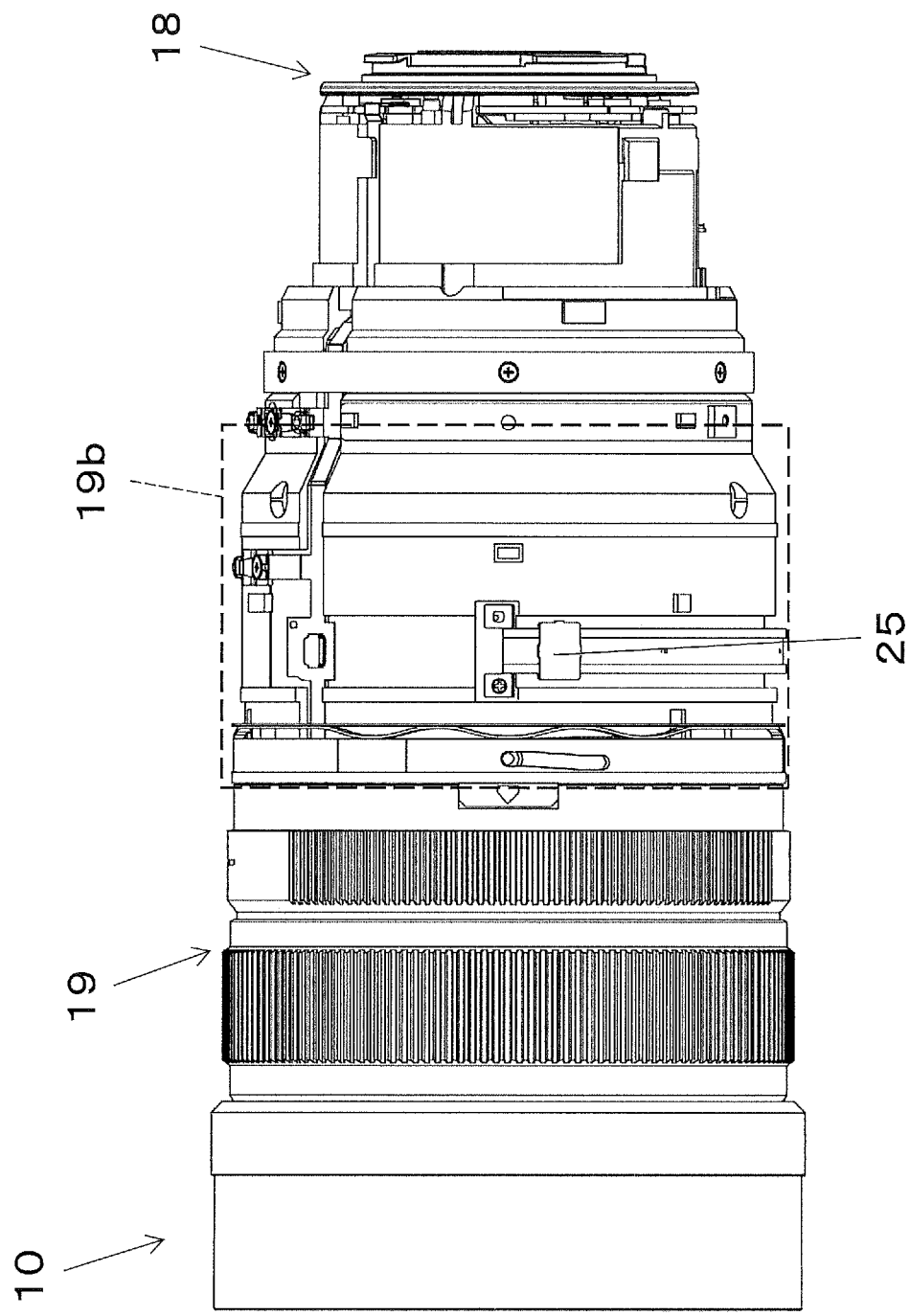
FIG. 12A is a side view of a state in which a rear frame of the lens barrel shown in FIG. 1, etc., has been removed.
Figure 13:
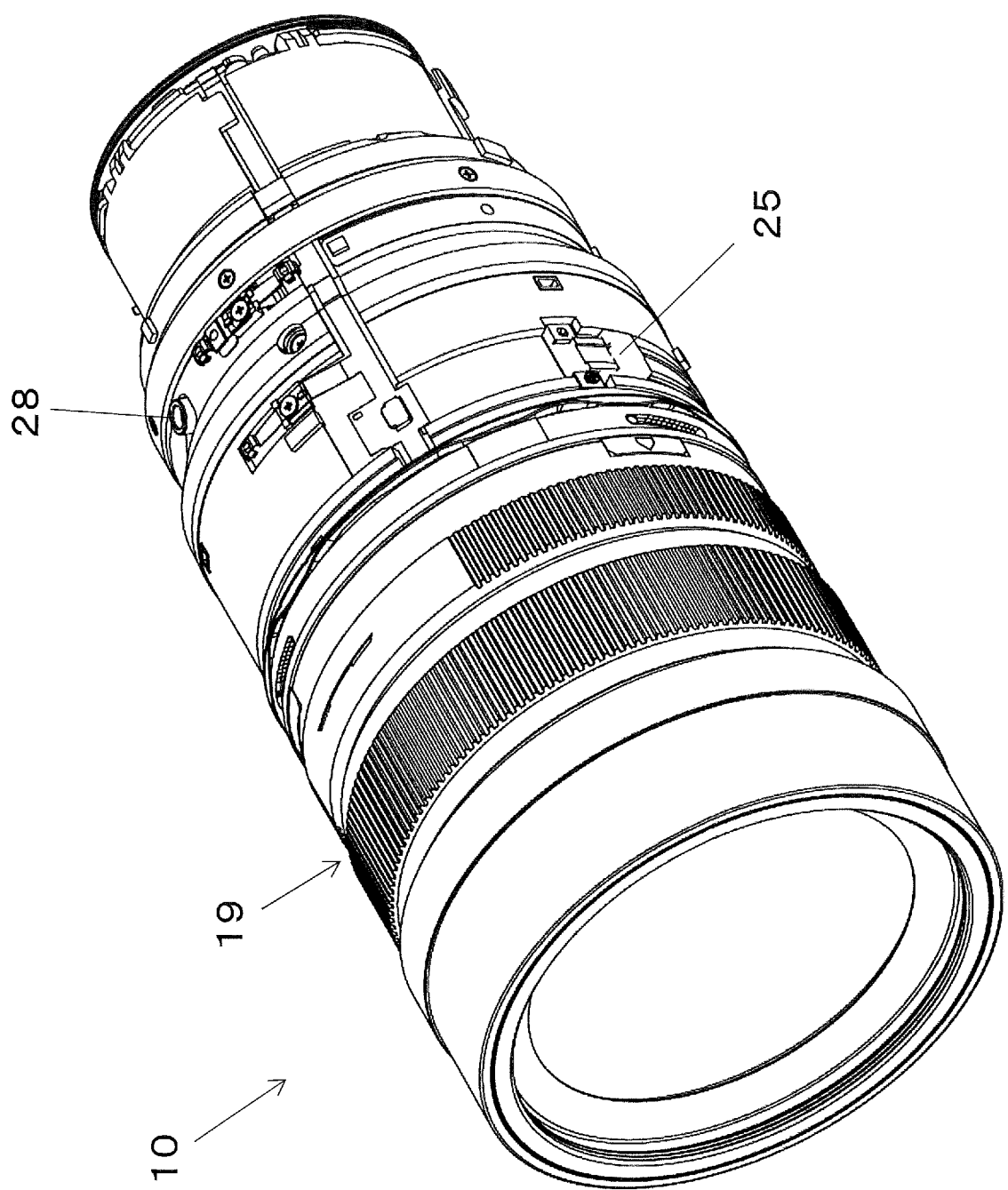
FIG. 13 is an oblique view of a zoom encoder and a zoom drive pin exposed when the rear frame of the lens barrel in FIG. 1 is removed.

As shown in FIGS. 12A and 13, the zoom encoder 25 is disposed on the inner peripheral side of the zoom ring 19b, and senses the relative positions of the lenses L1 to L20 included in the lens barrel.

Also, as shown in FIG. 13, the rotation of the zoom ring 19b is transmitted to a zoom drive pin 28 provided so as to protrude toward the inner peripheral side of the zoom ring 19b.

The zoom drive pin 28 is engaged with a cam groove formed in the cam frame 13, and when the zoom ring 19b is manually rotated, the cam frame 13 rotates via the zoom drive pin 28, and this changes the relative positions of the lenses L1 to L20 included in the lens barrel 10.

Figure 12B:
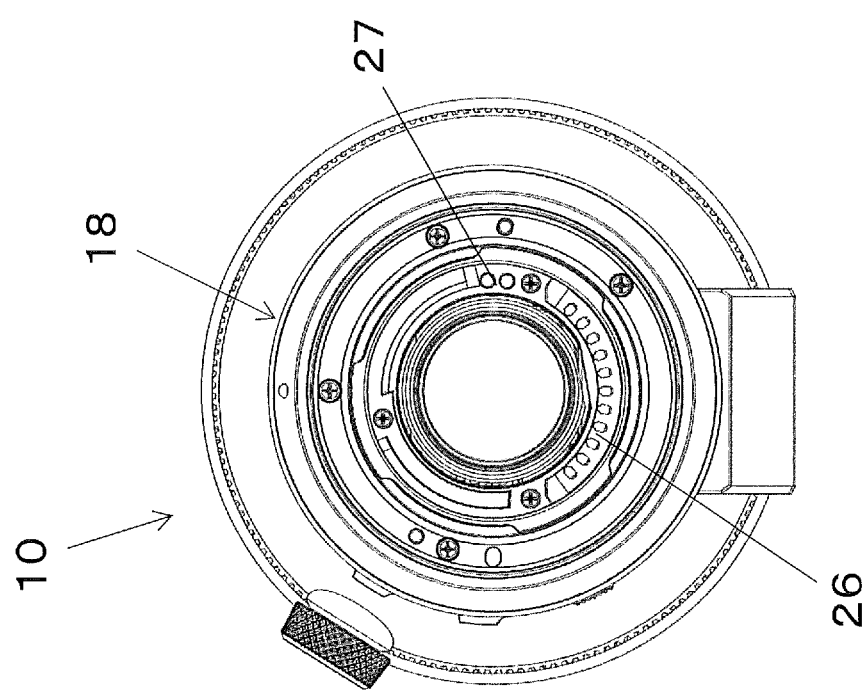
FIG. 12B is a front view of the configuration of the side of the lens barrel in FIG. 12A on which the teleconverter is mounted.

Also, as shown in FIG. 12B, the control board 21 is electrically connected to the teleconverter 30 or the camera body 50 via electrical contacts (lens contact 26 and teleconverter detection contact 27) provided at the end of the lens barrel 10 on the opposite side from the optical axis direction.

Figure 14B:
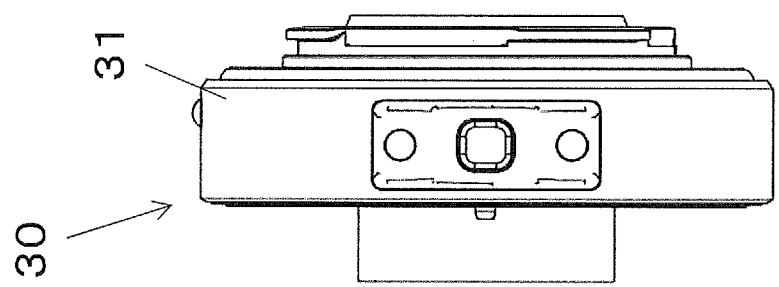
FIG. 14B is a side view of the teleconverter in FIG. 14A.
Figure 14A:
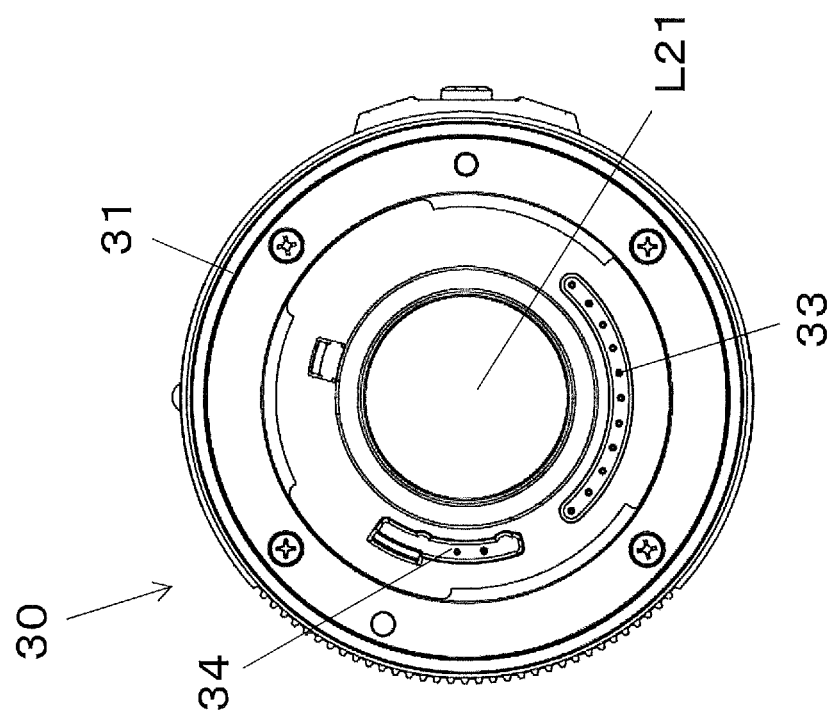
FIG. 14A is a front view of the configuration of the side of the teleconverter in FIG. 4B that connects with the lens barrel.
Figure 14C:
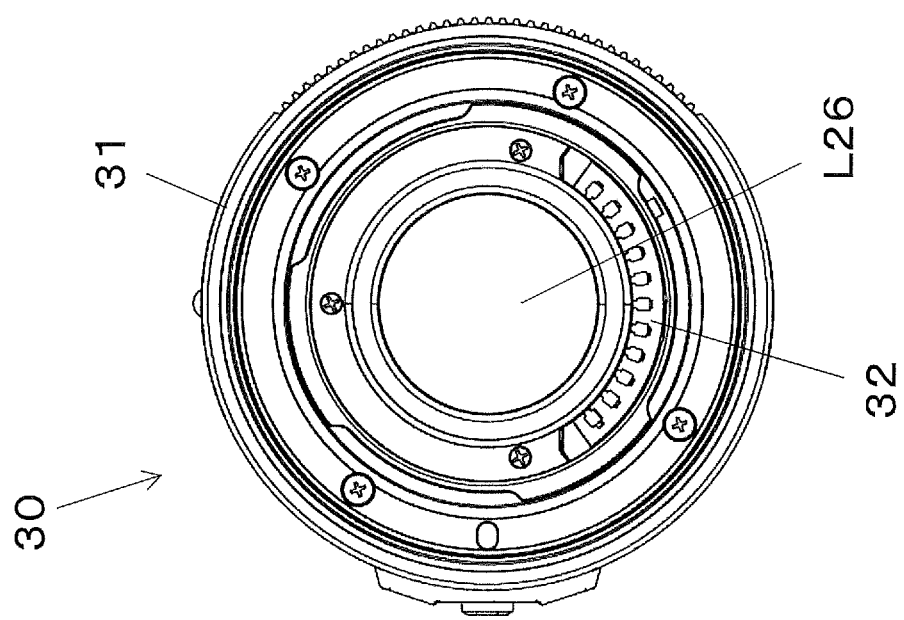
FIG. 14C is a rear view of the configuration of the side of the teleconverter in FIG. 14A that connects with the camera body.

Similarly, as shown in FIGS. 14A, 14B, and 14C, the teleconverter 30 comprises the main body portion 31, a lens contact 32 (see FIG. 14C) provided on the surface of the main body portion 31 on the side connected to the camera body 50, and a lens contact pin 33 and a teleconverter detection pin 34 (see FIG. 14A) provided on the surface of the main body portion 31 on the side connected to the lens barrel 10.

The lens contact 32 is disposed so as to make contact with a contact pin 53 provided on the camera body 50 side when the teleconverter 30 is mounted to the camera body 50. Consequently, the camera body 50 can transmit and receive various signals to and from the teleconverter 30 via the lens contact 32.

The lens contact pin 33 is disposed on the side connected to the lens barrel 10, as shown in FIG. 14A. The lens contact pin 33 is electrically connected to the lens contact 26 on the lens barrel 10 side when the teleconverter 30 is mounted to the lens barrel 10. Also, as shown in FIG. 15, the lens contact pin 33 is electrically connected to the lens contact 32 in the teleconverter 30.

Like the lens contact pin 33, the teleconverter detection pin 34 is disposed on the side connected to the lens barrel 10, as shown in FIG. 14A. The teleconverter detection pin 34 is electrically connected to the teleconverter detection contact 27 on the lens barrel 10 side when the teleconverter 30 is mounted to the lens barrel 10. Also, the teleconverter detection pin 34 is electrically connected to the lens contact 32 in the teleconverter 30, as shown in FIG. 15.

With the lens barrel 10 of this embodiment, in a state in which the teleconverter 30 is mounted between the camera body 50 and the lens barrel 10, the control board 21 detects a connection state between the teleconverter detection contact 27 and the teleconverter detection pin 34, and transmits to the camera body 50 a signal indicating that the teleconverter 30 is mounted.

On the other hand, in a state in which the teleconverter 30 is not mounted between the camera body 50 and the lens barrel 10, the control board 21 cannot detect a connection state between the teleconverter detection contact 27 and the teleconverter detection pin 34, and therefore does not transmit to the camera body 50 a signal indicating that the teleconverter 30 is mounted.

Consequently, the camera body 50 can determine whether or not the teleconverter 30 is mounted according to whether or not a signal has been received from the control board 21 of the lens barrel 10.

Figure 15:
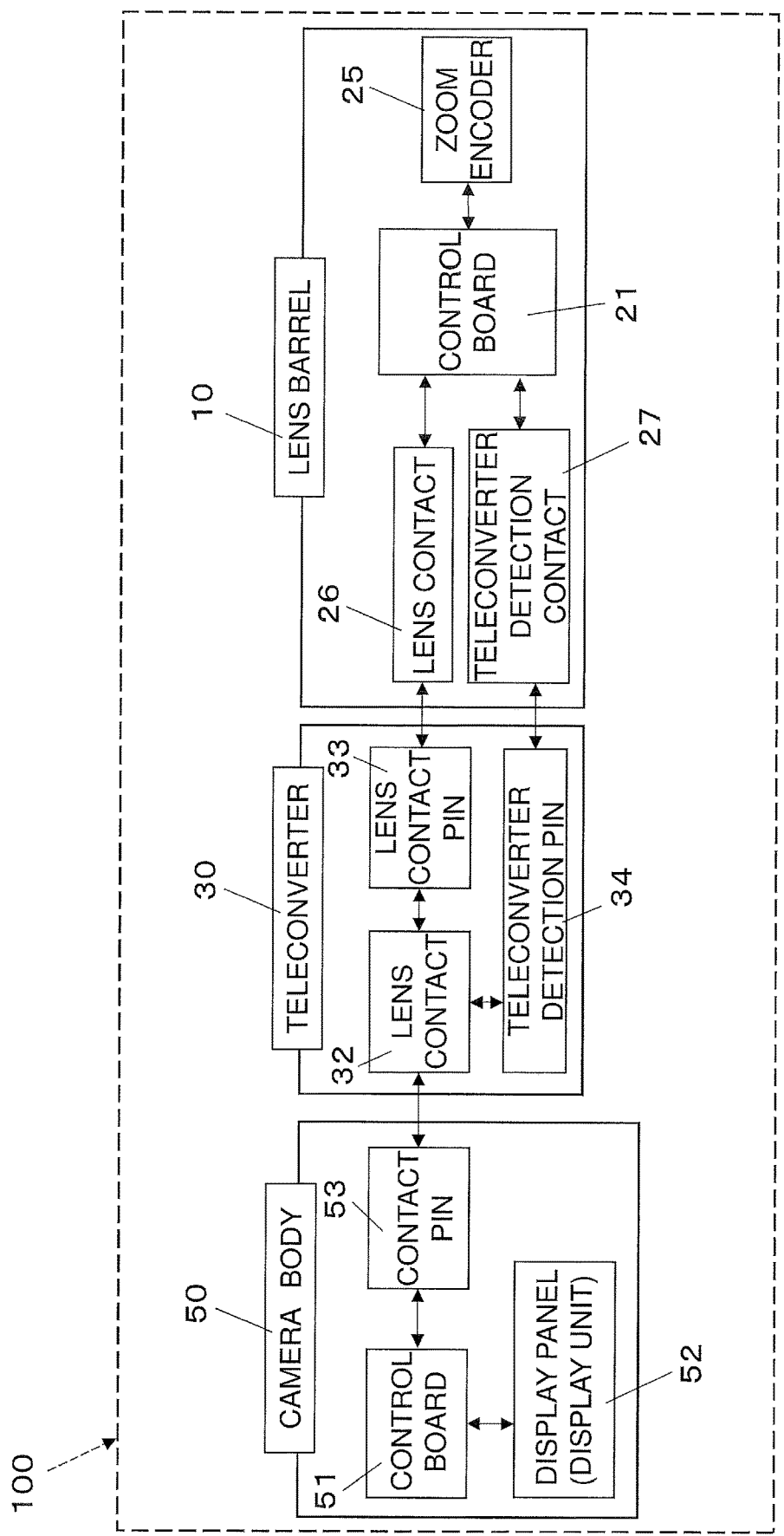
FIG. 15 is a control block diagram of the configuration of the camera system in FIG. 1.

Also, with the lens barrel 10 of this embodiment, as shown in FIG. 15, in a state in which the teleconverter 30 is mounted between the camera body 50 and the lens barrel 10, there is a possibility that contraction of the urging spring 17f will cause the positions of the lenses L19 and L20 included in the fifth lens group unit 17 to move and react to positions other than their normal positions.

Consequently, in a state in which the teleconverter 30 is mounted, the control board 21 transmits a display control signal so that a signal indicating the relative positions (such as the WIDE position or the TELE position) of the lenses L1 to L20 included in the lens barrel 10 detected by the zoom encoder 25 will be received, causing the display panel 52 of the camera body 50 to display a message prompting the use of the TELE side.

As a result, upon receiving a display control signal from the control board 21 of the lens barrel 10 via the lens contact 26, the lens contact pin 33, the lens contact 32, and the contact pin 53, the control board 51 of the camera body 50 can control the display panel 52 so as to give a display prompting use on the TELE side.

Consequently, the user can see the warning message displayed on the display panel 52 of the camera body 50 and can thereby recognize that proper photography cannot be performed at the WIDE position because the lens position is not correct.

As a result, in a state in which the teleconverter 30 is mounted, the display panel 52 on the camera body 50 side can display the conditions for performing proper photography while avoiding interference between the parts of the lens barrel 10 and the teleconverter 30.

Main Features

As shown in FIGS. 8A and 8B, the lens barrel 10 of this embodiment comprises the lens mount 23, the fifth lens group unit 17, the cam frame 13, the cam pin 17c, the cam pin holder 17b, the main shaft 17g and secondary shaft 17h, and the urging spring 17f. The teleconverter 30 is mounted to the lens mount 23. The fifth lens group unit 17 includes the lens L21, etc., that interfere in the optical axis direction when the teleconverter 30 is mounted. The cam frame 13 encloses the fifth lens group unit 17 and has the cam groove 13a. The cam pin 17c protrudes in a direction intersecting the optical axis direction and moves in the optical axis direction in a state of being engaged with the cam groove 13a. The cam pin holder 17b is provided to the fifth lens group unit 17 in a state of being capable of relative motion in the optical axis direction, and holds the cam pin 17c. The main shaft 17g and the secondary shaft 17h are disposed along the optical axis direction, allowing the fifth lens group unit 17 to move in the optical axis direction. The urging spring 17f is provided to the fifth lens group unit 17, urges the cam pin holder 17b toward the subject side in the optical axis direction, and contracts when the teleconverter 30 is mounted to the lens mount 23, thereby retracting the fifth lens group unit 17 in the optical axis direction.

Consequently, when the teleconverter 30 is mounted on the opposite side (image plane side) of the lens barrel 10 from the subject side in the optical axis direction, the main body portion 17a holding the lenses L19 and L20 included in the fifth lens group unit 17 disposed closest to the image plane side in the lens barrel 10 makes contact with the lens L21, etc., included in the teleconverter 30 and is pressed in the optical axis direction. At this point, the main body portion 17a moves relative to the cam pin holder 17b due to the contraction of the urging spring 17f.

That is, when the teleconverter 30 has been mounted to the lens barrel 10, only the main body portion 17a that holds the lenses L19 and L20 of the fifth lens group unit 17 moves in the optical axis direction, and the cam pin holder 17b is held without moving in the optical axis direction.

Consequently, even when the teleconverter 30 is mounted, problems such as damage to parts included in the lens barrel 10 and the teleconverter 30 can be avoided.

Other Embodiments

An embodiment of the present disclosure was described above, but the present disclosure is not limited to or by the above embodiment, and various modifications are possible without departing from the gist of the disclosure.

(A)

In the above embodiment, an example was given in which relative rotation of the cam frame 13 around the optical axis X moves the cam pin 17c engaged with the cam groove 13a, etc., thereby changing the relative positions of the lenses L1 to L20 included in the lens barrel 10, which allows photography at either the WIDE position or the TELE position. However, the present invention is not limited to this.

Figure 16:
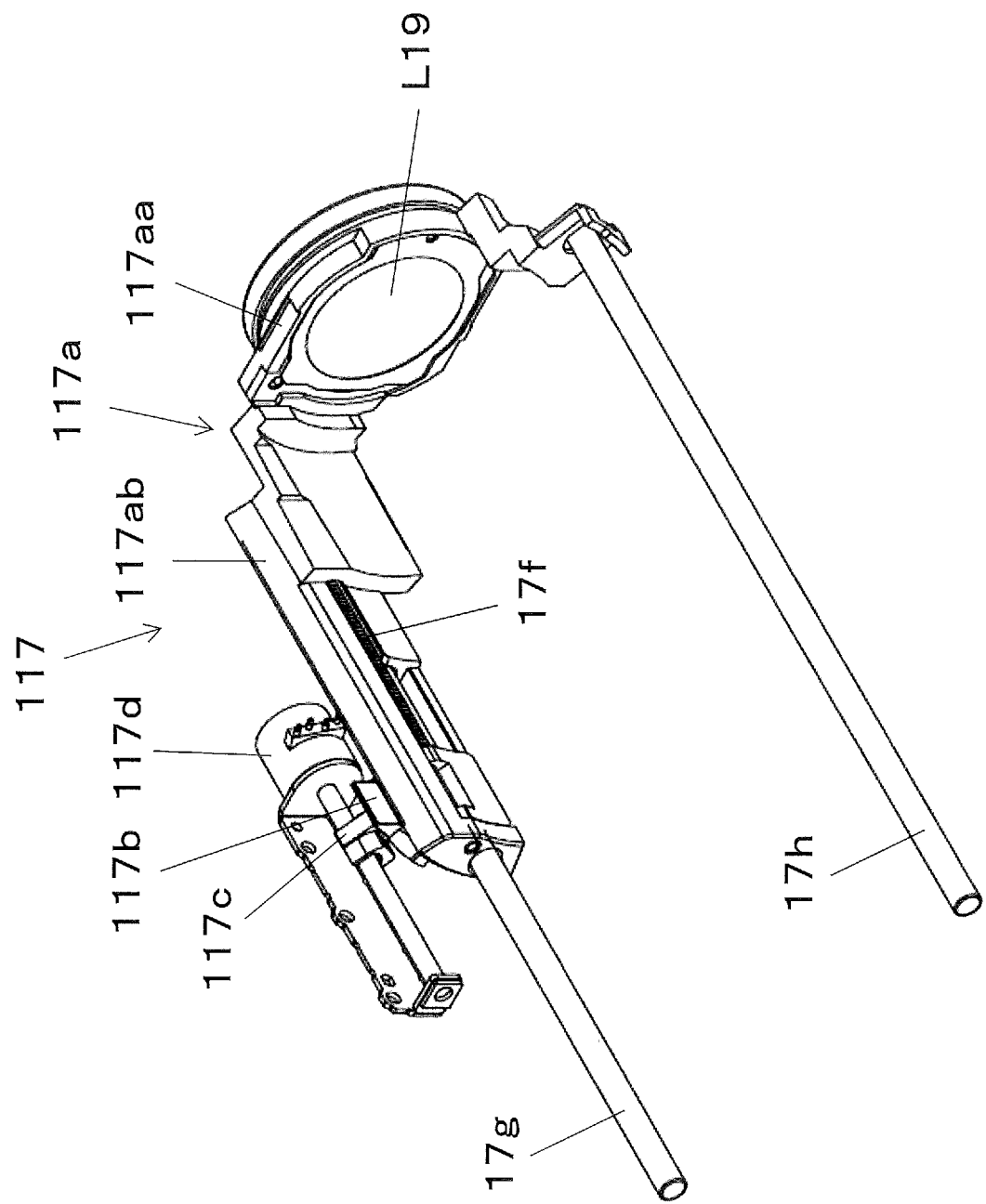
FIG. 16 is an oblique view showing the configuration of the fifth lens group unit included in the lens barrel according to another embodiment of the present invention.

For example, as shown in FIG. 16, a fifth lens group unit (retracting lens frame) 117 may be used that comprises a rack 117c that is driven back and forth along the optical axis direction by a stepping motor unit (drive unit) 117d instead of the cam pin 17c that engages with the cam groove 13a of the cam frame 13.

The fifth lens group unit 117 comprises a main body portion 117a, a rack holder 117b, the rack 117c, the stepping motor unit 117d, the urging spring 17f, the main shaft 17g, and the secondary shaft 17h.

The urging spring 17f, the main shaft 17g, and the secondary shaft 17h are configured the same as in Embodiment 1, and therefore will not be described again in detail.

As shown in FIG. 16, the main body portion 117a has a lens holding portion 117aa that holds the lenses L19 and L20, and an extension portion 117ab that extends in the optical axis direction from the outer peripheral portion of the lens holding portion 117aa.

The rack holder 117b is provided to the fifth lens group unit 117 in a state of being capable of relative motion in the optical axis direction, and holds the rack 117c. Also, like the cam pin holder 17b of Embodiment 1, the side surface of the rack holder 117b is urged along the optical axis direction by the urging spring 17f.

The rack 117c is provided so as to protrude in a direction intersecting the optical axis direction, and moves along the optical axis direction while being held by the rack holder 117b.

The stepping motor unit 117d includes a stepping motor, and moves the rack holder 117b back and forth in the optical axis direction by the rotational driving force of this stepping motor.

Figure 17A:
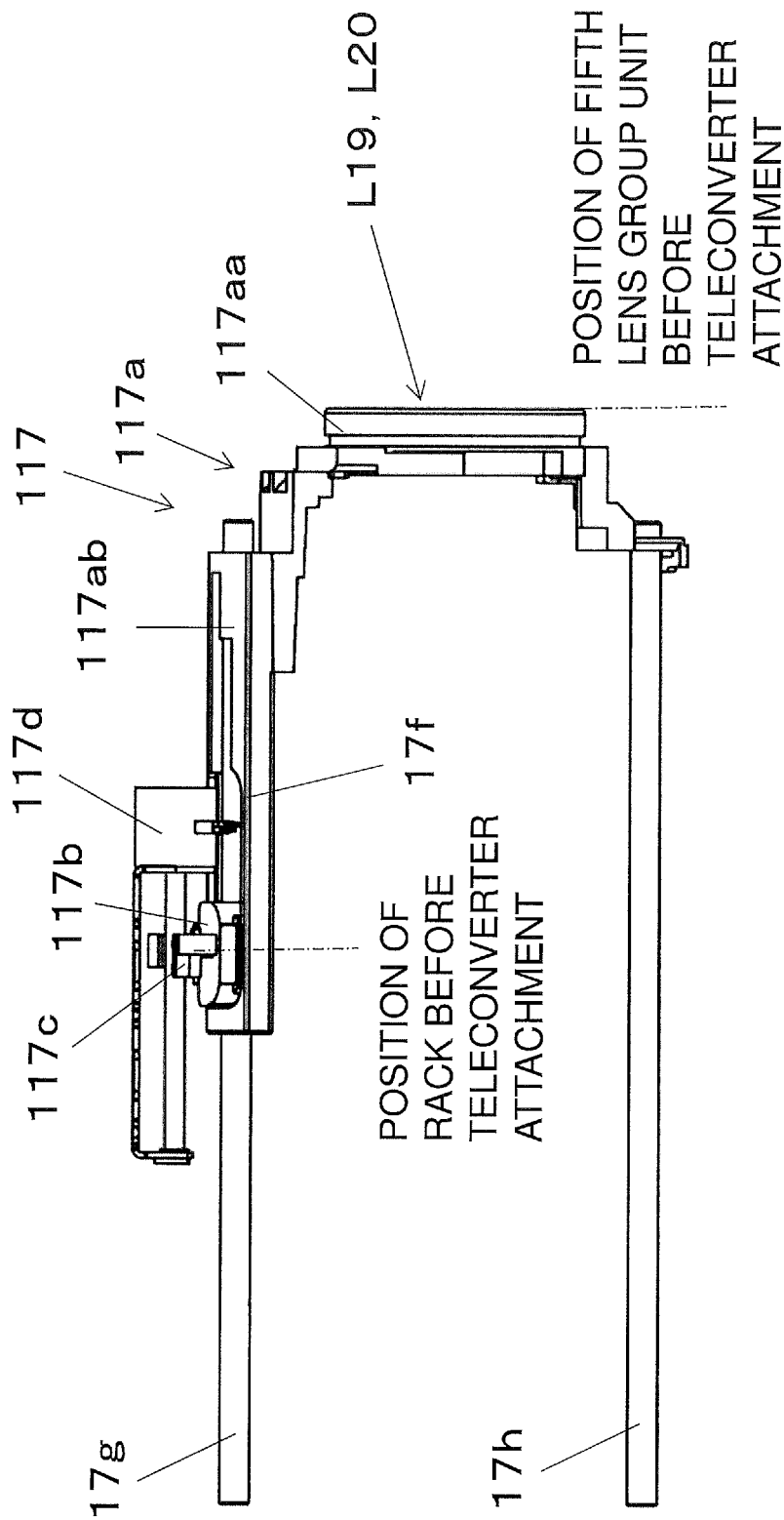
FIG. 17A is a side view of the state before the teleconverter is mounted to the fifth lens group unit in FIG. 16.
Figure 17B:
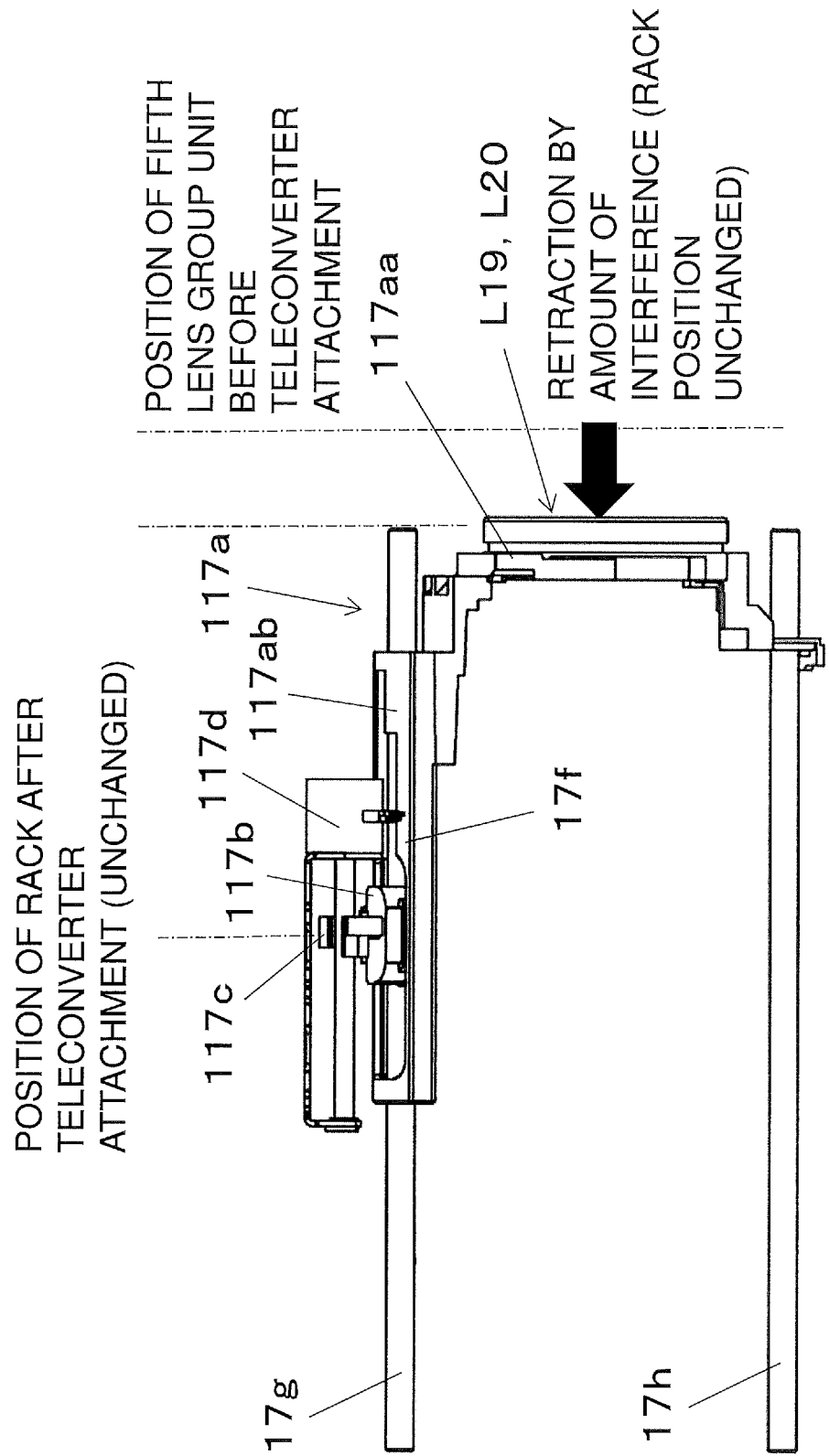
FIG. 17B is a side view of the state after the teleconverter is mounted to the fifth lens group unit in FIG. 16.

The lens barrel of this embodiment has the configuration described above, just as with the fifth lens group unit 17 of the first embodiment, when the teleconverter is mounted to the end of the fifth lens group unit 117 shown in FIG. 17A on the opposite side from the subject in the optical axis direction, a portion of the lens holding portion 117aa comes into contact with the teleconverter, and retracts toward the subject in the optical axis direction (see FIG. 17B).

At this point, the lens holding portion 117aa retracts toward the subject in the optical axis direction by the amount of interference on the teleconverter side, and the rack 117c held by the rack holder 117b does not move in the optical axis direction.

That is, the rack holder 117b is urged in the optical axis direction by the urging spring 17f, and when the teleconverter is mounted, the urging spring 17f contracts, so that only the lens holding portion 117aa of the fifth lens group unit 117 moves in the optical axis direction, and the position of the rack holder 117b remains unchanged.

Consequently, with the configuration of this embodiment, as shown in FIGS. 17A and 17B, even when a teleconverter is mounted, damage to parts on the lens barrel side or the teleconverter side and other such problems can be avoided.

(B)

In the embodiment described above, an example was given in which, when the teleconverter 30 was mounted, the urging spring 17f included in the fifth lens group unit (retracting lens frame) 17 contracted, so that the main body portion 17a of the fifth lens group unit 17 moved toward the cam pin 17c (cam pin holder) 17b. However, the present disclosure is not limited to this.

For instance, with a configuration in which the urging spring is positioned on the subject side in the optical axis direction of the cam pin holder, when the teleconverter is mounted, the urging spring 17f is pulled, causing the main body portion 17a of the fifth lens group unit 17 to move toward the cam pin 17c (cam pin holder 17b).

(C)

In the above embodiment, an example was given in which the fifth lens group unit 17 was used as the retractable lens frame that was retracted when the teleconverter 30 was mounted. However, the present disclosure is not limited to this.

For instance, the retractable lens frame that is retracted when a teleconverter is mounted is not limited to being the fifth lens group unit, and may be some other lens group unit instead.

(D)

In the above embodiment, an example was given in which the fifth lens group unit 17 serving as the retractable lens frame moved back and forth in the optical axis direction along two guide shafts, the main shaft 17g and the secondary shaft 17h. However, the present disclosure is not limited to this.

For instance, the number of guide shafts that guide the retractable lens frame in the optical axis direction may be one, or may be three or more.

(E)

In the above embodiment, an example was given in which the end of the fifth lens group unit 17 on the side where the teleconverter 30 was mounted was provided with the cushioning material 17i that cushioned the impact when a member on the teleconverter 30 side and a member on the fifth lens group unit 17 side came into contact with each other. However, the present disclosure is not limited to this.

For instance, if a member on the teleconverter side and a member on the retractable lens frame side are strong enough to prevent damage and other such problems even if they collide with each other, a configuration without a cushioning material (buffer member) may be used.

(F)

In the above embodiment, an example was given in which, when it was detected that the teleconverter 30 was mounted and that the lens position sensed by the zoom encoder 25 was on the WIDE side, a message prompting use on the TELE side was displayed on the display panel 52 of the camera body 50. However, the present disclosure is not limited to this.

For instance, when it is detected that a teleconverter is mounted, a message may be displayed indicating that photography on the WIDE side is impossible.

INDUSTRIAL APPLICABILITY

The lens barrel of the present invention exhibits the effect that damage to parts and other such problems can be avoided even when a teleconverter has been mounted, and as such is widely applicable to lens barrels mounted to various kinds of camera.

REFERENCE SIGNS LIST 10 lens barrel
11 first lens group unit
12 second lens group unit
13 cam frame
13a cam groove
14 fixed frame
14a through-groove
15 third lens group unit
16 fourth lens group unit
17 fifth lens group unit (retractable lens frame)
17a main body portion
17aa lens holding portion (holding portion)
17ab extension portion
17b cam pin holder
17ba recess
17bb protrusion
17bc insertion hole
17c cam pin
17ca cam pin spring
17d cam pin holder guide shaft (second guide shaft)
17e rotation restricting portion
17ea contact portion
17f urging spring
17g main shaft (first guide shaft)
17h secondary shaft (first guide shaft)
17i cushion material (buffer member)
18 mounting base
19 exterior unit
19a focus ring
19b zoom ring
20 rear frame
21 control board (display control unit)
22 lens attachment index ring unit
23 lens mount (mounting unit)
25 zoom encoder
26 lens contact
27 teleconverter detection contact (mounting detection unit)
28 zoom drive pin
30 teleconverter
31 main body portion
32 lens contact
33 lens contact pin
34 teleconverter detection pin
50 camera body
51 control board
52 display panel (display unit)
53 contact pin
100 camera
117 fifth lens group unit (retractable lens frame)
117a main body portion
117aa lens holding portion
117ab extension portion
117b rack holder
117c rack
117d stepping motor unit (drive unit)
L1 to L20 lenses (optical lenses)
L21 to L26 lenses (optical lenses)
X optical axis

The invention claimed is:

1. A lens barrel that is attached to a camera body in a replaceable state, the lens barrel comprising:
a mounting unit to which a teleconverter is mounted;
a retractable lens frame that includes an optical lens that interferes in an optical axis direction when the teleconverter is mounted;
a substantially cylindrical cam frame that encloses the retractable lens frame and has a cam groove;
a cam pin that protrudes in a direction intersecting the optical axis direction and that is configured to move in the optical axis direction in a state of being engaged with the cam groove formed in the cam frame;
a cam pin holder that is provided to the retractable lens frame in a state of being capable of relative motion in the optical axis direction, and that holds the cam pin;
a first guide shaft that is disposed along the optical axis direction and is configured to allow the retractable lens frame to move in the optical axis direction; and
an urging spring that is provided to the retractable lens frame, is configured to urge the cam pin holder toward a subject side in the optical axis direction, and expand or contract when the teleconverter is mounted to the mounting unit so as to retract the retractable lens frame in the optical axis direction.

2. The lens barrel according to claim 1,
wherein the cam pin is disposed at the same position with respect to the cam frame before the teleconverter is mounted and after the teleconverter is mounted.

3. The lens barrel according to claim 1,
further comprising a second guide shaft that is provided to the retractable lens frame and is configured to guide a movement of the cam pin holder in the optical axis direction; and a rotation restricting portion configured to restrict rotation around the second guide shaft of the cam pin holder configured to move in the optical axis direction along the second guide shaft.

4. The lens barrel according to claim 3,
wherein the rotation restricting portion hits the cam pin holder at both ends in a radial direction of a circle centered on an optical axis of the optical lens.

5. The lens barrel according to claim 1,
further comprising a substantially cylindrical fixed frame that is provided between the cam frame and the retractable lens frame and has a through-groove in which the cam pin holder is exposed on a side of the cam frame, and the cam pin holder has a protrusion that is latched in the through-groove of the fixed frame so as to prevent the cam pin from falling out of the cam groove.

6. The lens barrel according to claim 1,
wherein the cam pin holder has an insertion hole into which the first guide shaft is inserted at a specific gap.

7. The lens barrel according to claim 1,
further comprising a mounting detection unit configured to detect that the teleconverter has been mounted to the mounting unit.

8. The lens barrel according to claim 7,
further comprising a display control unit configured to control a display unit provided to the camera body so that a message indicating a photography warning is displayed according to a position of the optical lens held by the retractable lens frame and the detection by the mounting detection unit that the teleconverter has been mounted.

9. The lens barrel according to claim 1,
wherein the first guide shaft has a main shaft configured to guide movement of the retractable lens frame in the optical axis direction, and a secondary shaft configured to restrict rotation of the retractable lens frame around the first guide shaft.

10. The lens barrel according to claim 1,
wherein the urging spring expands or contracts in a state in which the optical lens is near a wide angle position, and retracts the retractable lens frame.

11. The lens barrel according to claim 1,
further comprising a cushioning material that is provided on a side of the retractable lens frame where the teleconverter is mounted, and that is configured to reduce an impact with a member on a side of the teleconverter.

12. The lens barrel according to claim 1,
wherein the retractable lens frame has a holding part that holds the optical lens, and
when the teleconverter is mounted, the holding part moves in the direction in which the urging spring expands or contracts and approaches the cam pin holder.

13. A camera, comprising:
the lens barrel according to claim 1; and
a camera body to which the lens barrel is mounted.

14. A lens barrel that is mounted to a camera body in a replaceable state, the lens barrel comprising:
a mounting unit to which a teleconverter is mounted;
a retractable lens frame that includes an optical lens that interferes in an optical axis direction when the teleconverter is mounted;
a rack that projects in a direction intersecting the optical axis direction and that is configured to move along the optical axis direction;
a rack holder that is provided to the retractable lens frame in a state of being capable of relative motion in the optical axis direction, and that holds the rack;
a drive unit that is linked to the rack and is configured to move the retractable lens frame back and forth in the optical axis direction via the rack holder;
a first guide shaft that is disposed along the optical axis direction and is configured to allow the retractable lens frame to move in the optical axis direction; and
an urging spring that is provided to the retractable lens frame, is configured to urge the rack holder toward a subject side in the optical axis direction, and expand or contract when the teleconverter is mounted to the mounting unit so as to retract the retractable lens frame in the optical axis direction.

15. A camera, comprising:
the lens barrel according to claim 14; and
a camera body to which the lens barrel is mounted.

* * * * *